US012416263B2

(12) United States Patent
Owoeye

(10) Patent No.: US 12,416,263 B2
(45) Date of Patent: Sep. 16, 2025

(54) ROTATABLE HEAT EXCHANGER FOR A GAS TURBINE ENGINE

(71) Applicant: General Electric Company, Schenectady, NY (US)

(72) Inventor: Eyitayo James Owoeye, Houston, TX (US)

(73) Assignee: General Electric Company, Evendale, OH (US)

( * ) Notice: Subject to any disclaimer, the term of this patent is extended or adjusted under 35 U.S.C. 154(b) by 36 days.

(21) Appl. No.: 18/310,116

(22) Filed: May 1, 2023

(65) Prior Publication Data

US 2024/0369019 A1 Nov. 7, 2024

(51) Int. Cl.
| | | |
|---|---|---|
| *F02C 7/16* | (2006.01) | |
| *F02C 7/06* | (2006.01) | |
| *F28D 7/02* | (2006.01) | |
| *F28D 9/04* | (2006.01) | |
| *F28D 11/04* | (2006.01) | |
| *F02C 7/14* | (2006.01) | |

(52) U.S. Cl.
CPC .............. *F02C 7/16* (2013.01); *F02C 7/06* (2013.01); *F28D 7/02* (2013.01); *F28D 9/04* (2013.01); *F28D 11/04* (2013.01); *F02C 7/14* (2013.01); *F05D 2240/50* (2013.01); *F05D 2260/213* (2013.01); *F05D 2260/98* (2013.01)

(58) Field of Classification Search
None
See application file for complete search history.

(56) References Cited

U.S. PATENT DOCUMENTS

| | | | |
|---|---|---|---|
| 3,844,341 A | 10/1974 | Bimshas, Jr. et al. | |
| 4,190,398 A | 2/1980 | Corsmeier et al. | |
| 4,238,927 A | 12/1980 | Joubert et al. | |
| 5,117,904 A * | 6/1992 | Bond .................. | F28F 9/22 |
| | | | 165/163 |
| 5,878,808 A | 3/1999 | Rock et al. | |
| 7,836,939 B2 | 11/2010 | Zimmerman et al. | |
| 8,261,527 B1 * | 9/2012 | Stearns ............... | F02C 7/06 |
| | | | 60/39.83 |
| 10,408,223 B2 | 9/2019 | Heikurinen et al. | |
| 10,415,468 B2 | 9/2019 | Ackermann et al. | |
| 10,684,044 B2 | 6/2020 | Schroeder | |
| 11,209,222 B1 | 12/2021 | Colson | |
| 11,359,864 B2 | 6/2022 | Becene et al. | |

(Continued)

FOREIGN PATENT DOCUMENTS

WO WO03/016794 A1 2/2003

*Primary Examiner* — Lorne E Meade
*Assistant Examiner* — Alyson Joan Harrington
(74) *Attorney, Agent, or Firm* — Dority & Manning, P.A.

(57) ABSTRACT

A rotatable heat exchanger includes a first manifold assembly, a second manifold assembly, and a core extending axially from the first manifold assembly to the second manifold assembly. The first manifold assembly, the core, and the second manifold assembly are formed to mount around and rotate with a shaft. The core includes a plurality of helical passages that extend from the first manifold assembly to the second manifold assembly. The plurality of helical passages includes a plurality of first-fluid passages fluidly coupled to the first manifold assembly and to the second manifold assembly, and a plurality of second-fluid passages fluidly coupled to the first manifold assembly and the second manifold assembly.

15 Claims, 14 Drawing Sheets

(56) References Cited

U.S. PATENT DOCUMENTS

| | | |
|---|---|---|
| 11,459,909 B2 | 10/2022 | Diosady et al. |
| 2020/0025456 A1 | 1/2020 | Schroeder |
| 2022/0082029 A1 | 3/2022 | Diosady et al. |
| 2023/0015392 A1* | 1/2023 | Van Affelen .......... F01K 25/103 |

* cited by examiner

| ENGINE PARAMETERS | EXAMPLE 1 | EXAMPLE 2 | EXAMPLE 3 |
|---|---|---|---|
| FAN RADIUS ($R_F$, METERS) | 0.25 | 1.0 | 1.5 |
| LP SHAFT SPEED, $N_S$ (RPM) | 3000 | 12000 | 15000 |
| BYPASS RATIO (BPR) | 3 | 12 | 30 |
| $R_{HX}/R_S$ | 1.2 | 3 | 5 |
| $R_S/R_H$ | 0.1 | 0.2 | 0.8 |
| $R_H/R_F$ | 0.1 | 0.25 | 0.7 |
| $\Delta H_{CHANNEL}$ (METERS) | 0.5 | 30 | 150 |
| $f_{CHANNEL}$ | 10 | 2000 | 4000 |
| RHECP | 2.66 | 19.14 | 34.45 |

FIG. 13

ROTATABLE HEAT EXCHANGER FOR A GAS TURBINE ENGINE

FIELD

The present disclosure relates to a gas turbine engine, and more particularly to a rotatable heat exchanger for a gas turbine engine.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by a rotor shaft.

A bearing compartment is used to house a bearing assembly which enables smooth rotation of the rotor shaft in gas turbine engines. The bearing compartment houses a bearing cavity and buffer cavity which are partly separated by seals (e.g. carbon/lift-off seals). The bearing cavity is usually supplied with lubrication oil to reduce friction and the seals to keep the oil in-place.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 13 provides a table including numerical values corresponding to several rotatable heat exchangers falling within the ranges depicted in FIG. 14.

DETAILED DESCRIPTION

Figure 1:
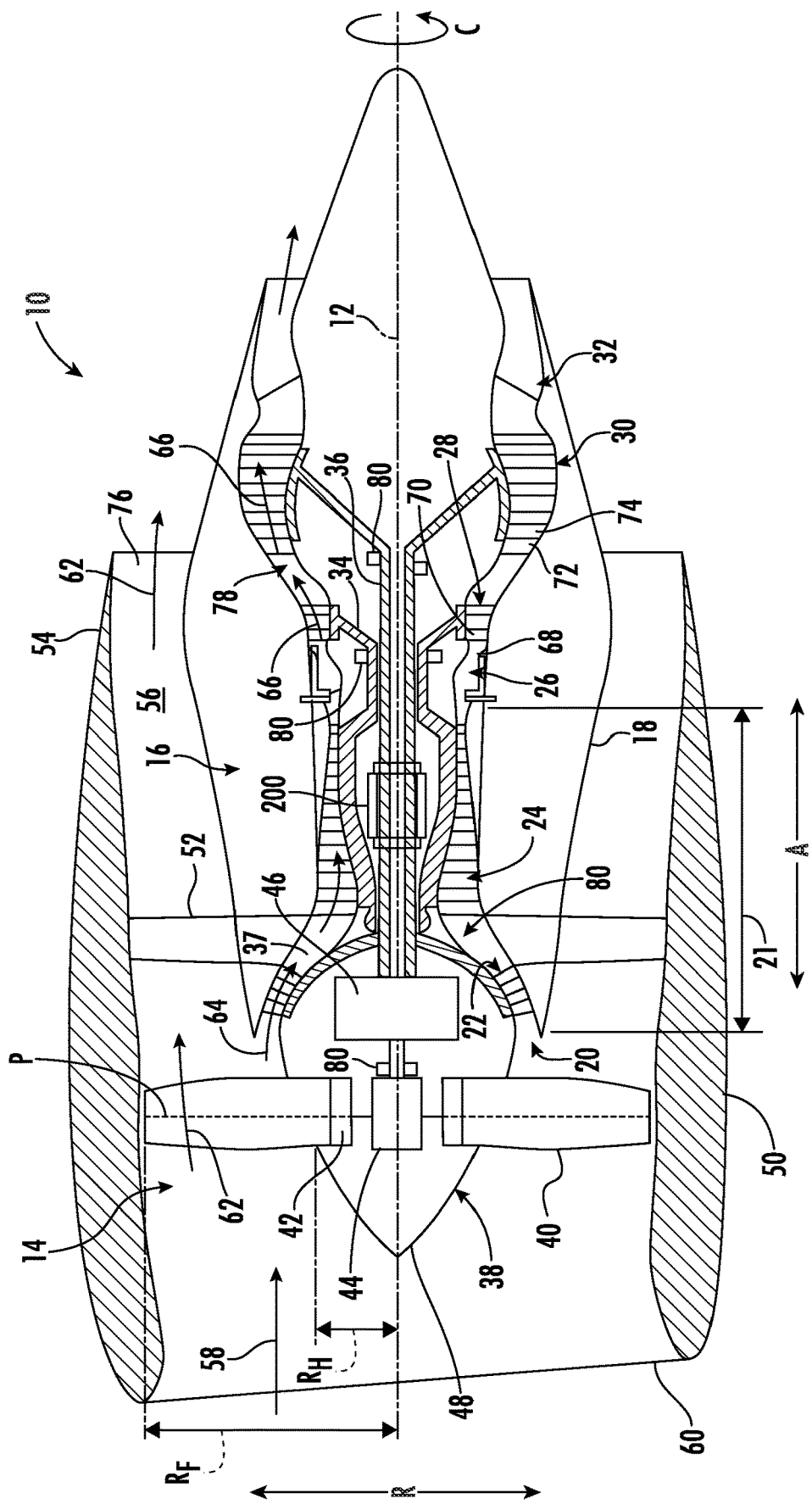
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The term "turbomachine" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

The terms "coupled," "fixed," "attached to," and the like refer to both direct coupling, fixing, or attaching, as well as indirect coupling, fixing, or attaching through one or more intermediate components or features, unless otherwise specified herein.

The phrases "from X to Y" and "between X and Y" each refers to a range of values inclusive of the endpoints (i.e., refers to a range of values that includes both X and Y).

The term "100% shaft speed operating condition" refers to an operating condition of a gas turbine engine wherein at least one shaft of the gas turbine engine is operated at rotational speed corresponding to its 100% shaft speed capacity. The 100% shaft speed capacity is a shaft operating condition that may occur during a takeoff operating condition, a maximum power cruise operating condition, or other high power operating condition. In some configurations, the 100% shaft speed operating condition may be less than a redline operating speed for the shaft.

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough. Compressed air from the compressor section (i.e., bleed air) is utilized for a variety of functions within the turbomachine, such as to pressurize bearing cavities, cool components of the turbomachine, etc. Depending on where the bleed air is taken from the compressor section, the bleed air may be at a relatively high temperature, such that it needs to be cooled to accomplish certain functions.

In particular, the inventor of the present disclosure sought out to provide bleed air from an HP compressor of the turbomachine to a sump cavity to pressurize the sump cavity. The inventor found, however, that when the bleed air is provided at a relatively high temperature, as is typical of the bleed air from a stage of the HP compressor having airflow at a sufficiently high pressure to meet the pressurization needs for the sump cavity, the bleed air degrades the seals positioned within the sump cavity designed to prevent oil leakage. Therefore, the inventor recognized a need to cool the bleed air upstream of the bleed cavity to avoid this issue.

The inventor recognized that a rotatable heat exchanger can be coupled to a shaft of the turbomachine to cool the bleed air. The rotatable heat exchanger transfers heat from the bleed air to a heat exchange fluid, such as, e.g., lubrication oil, fuel, etc. Previous thinking has lead to the conclusion that including such a heat exchanger would create excessive drag on the driving shaft and would be too difficult to control (or too difficult to control flow through such a heat exchanger) to justify any thermal management benefits associated with inclusion within the turbomachine.

However, the inventor discovered, unexpectedly, in the course of designing a rotatable heat exchanger for the above noted need that the costs associated with inclusion of the rotatable heat exchanger on the shaft of the turbomachine may be overcome by the thermal management benefits, contrary to previous thinking and expectations. In particular, the inventor discovered during the course of designing several rotatable heat exchangers to be used with several engine architectures of varying thrust classes and mission requirements (including the rotatable heat exchangers and engines illustrated and described in detail herein), a relationship exists among an amount of airflow available to the heat exchanger (as may be indicated by bypass ratio and fan radius), various geometric ratios of the passages through the heat exchanger, and an expected rotational speed of the rotatable heat exchanger, whereby including a rotatable heat exchanger in accordance with one or more of the exemplary aspects described herein results in a net benefit to the overall engine design. As noted, previous thinking was that the cost for including a rotatable heat exchanger coupled to a shaft of the turbomachine to reduce a temperature of a bleed airflow was too prohibitive, as compared to the benefits of doing so.

With a goal of arriving at an improved gas turbine engine capable of providing cooled bleed air to the buffer cavity(ies), the inventor proceeded in the manner of designing gas turbine engines having a rotatable heat exchanger coupled to a shaft of a turbomachine with various amounts of airflow available to the rotatable heat exchanger, with a variety of geometric ratios of the passages through the heat exchanger, and operable at various rotational speeds; checking a operability and thermal rejection characteristics of the designed gas turbine engine; redesigning the gas turbine engine to vary the noted parameters based on the impact on other aspects of the gas turbine engine; rechecking the operability and thermal rejection characteristics of the redesigned gas turbine engine; etc. during the design of several different types of rotatable heat exchangers and gas turbine engines, including the rotatable heat exchangers and gas turbine engines described below with reference to FIGS. 1 through 14, which are described below in greater detail.

For example, one such rotatable heat exchanger of the present disclosure discovered by the inventor may be used to cool a bleed air provided to pressurize a bearing compartment. The bearing compartment houses a bearing assembly, which enables smooth rotation of a low-pressure (LP) rotor shaft in the gas turbine engine. The bearing compartment also houses a bearing cavity and a buffer cavity which are partly separated by seals (e.g., carbon/lift-off seals). The bearing cavity is usually supplied with lubrication oil to reduce friction. Seals are used keep the oil in-place. The seals are engaged to seal runners that are secured to the LP shaft.

To ensure zero or minimal oil leakage, high pressure compressed air from a compressor section of the gas turbine engine is supplied to the buffer cavity to create an air gap at a higher pressure relative to that of the lubricating oil in the bearing cavity. However, since the compressed air is bled-off from the compressor stage, it is typically supplied at high temperature, which can cause reduced lifespan of the seals and other components downstream, possibly resulting in oil leakage from the bearing cavity. This disclosure introduces a compact shaft-mounted rotatable heat exchanger for cooling the compressed air, and subsequently the seals, using a fluid such as the lubricating oil as the cooling fluid. The rotatable heat exchanger may be designed to achieve the above noted goals, while minimizing the costs associated with inclusion of the rotatable heat exchanger.

In one embodiment, the rotatable heat exchanger includes a core having multiple cylindrical plates with different diameters that surround the rotor shaft and are concentric about the shaft's rotational axis. The concentric cylindrical plates are linked with each other and connected to inner and outer casings by radially spaced and circumferentially-arranged helical plates with one or more turns, which also provides structural support for the core and acting as channel walls. This forms helical flow channels with one or more turns spanning across the axial ends of the cylindrical plates. The axial ends of the core are connected to two manifold assemblies that each allow inflow and/or outflow of two different flow streams, thereby forming a two-fluid rotatable heat exchanger that is then linked to the seal runners.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is configured as a high-bypass turbofan jet engine 10, referred to herein as "turbofan engine 10." As shown in FIG. 1, the turbofan engine 10 defines an axial direction "A" (extending parallel to a longitudinal centerline or axis 12 provided for reference), a radial direction "R", and a circumferential direction "C" extending about the axial direction A. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases and the turbomachine 16 includes, in serial flow relationship, a compressor section 21 including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 10.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R and collectively define a fan radius (RF) equal to a distance from the longitudinal axis 12 to the radially outer tips of the fan blades 40. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. The front hub 48 defines a hub radius (RH) equal to a distance from the longitudinal axis 12 to a radially outermost point of the front hub 48. Additionally, the exemplary fan section 14 includes an annular fan casing or nacelle 50 that circumferentially surrounds the fan 38 and/or at least a portion of the turbomachine 16. The exemplary nacelle 50 is supported relative to the turbomachine 16 by a plurality of circumferentially-spaced outlet guide vanes 52. Moreover, a downstream section 54 of the nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a power generation gas turbine engine, a steam turbine, a centrifugal compressor, and/or a turbocharger.

In order to support rotary components, such as the fan section 14, the LP shaft 36 and the HP shaft 34, the turbofan engine 10 includes a plurality of bearing assemblies 80 attached to various structural components within the turbofan engine 10. Specifically, for the embodiment depicted the bearing assemblies 80 facilitate rotation of, e.g., the LP shaft 36 and HP shaft 34 and dampen vibrational energy imparted to bearing assemblies 80 during operation of the turbofan engine 10. Although the bearing assemblies 80 are described and illustrated as being located generally at forward and aft ends of the respective LP shaft 36 and HP shaft 34, the bearing assemblies 80 may additionally, or alternatively, be located at any specifically pre-determined location along the LP shaft 36 and HP shaft 34 including, but not limited to, central or mid-span regions of the HP and LP shafts 34, 36, or other locations along HP and LP shafts 34, 36 where the use of conventional bearing assemblies 80 would present significant design challenges. The exemplary bearing assemblies 80 may include radial support bearings for supporting static and dynamic forces along the radial direction R, as well as axial support bearings, or thrust bearings, for supporting static and dynamic forces along the axial direction A. Further, in exemplary embodiments, the bearing assemblies 80 are oil-lubricated bearings. For example, in one embodiment, conventional oil-lubricated bearings may be located at the ends of HP and LP shafts 34, 36, and one or more bearing assemblies 80 may be located along central or mid-span regions of HP and LP shafts 34, 36.

Figure 2:
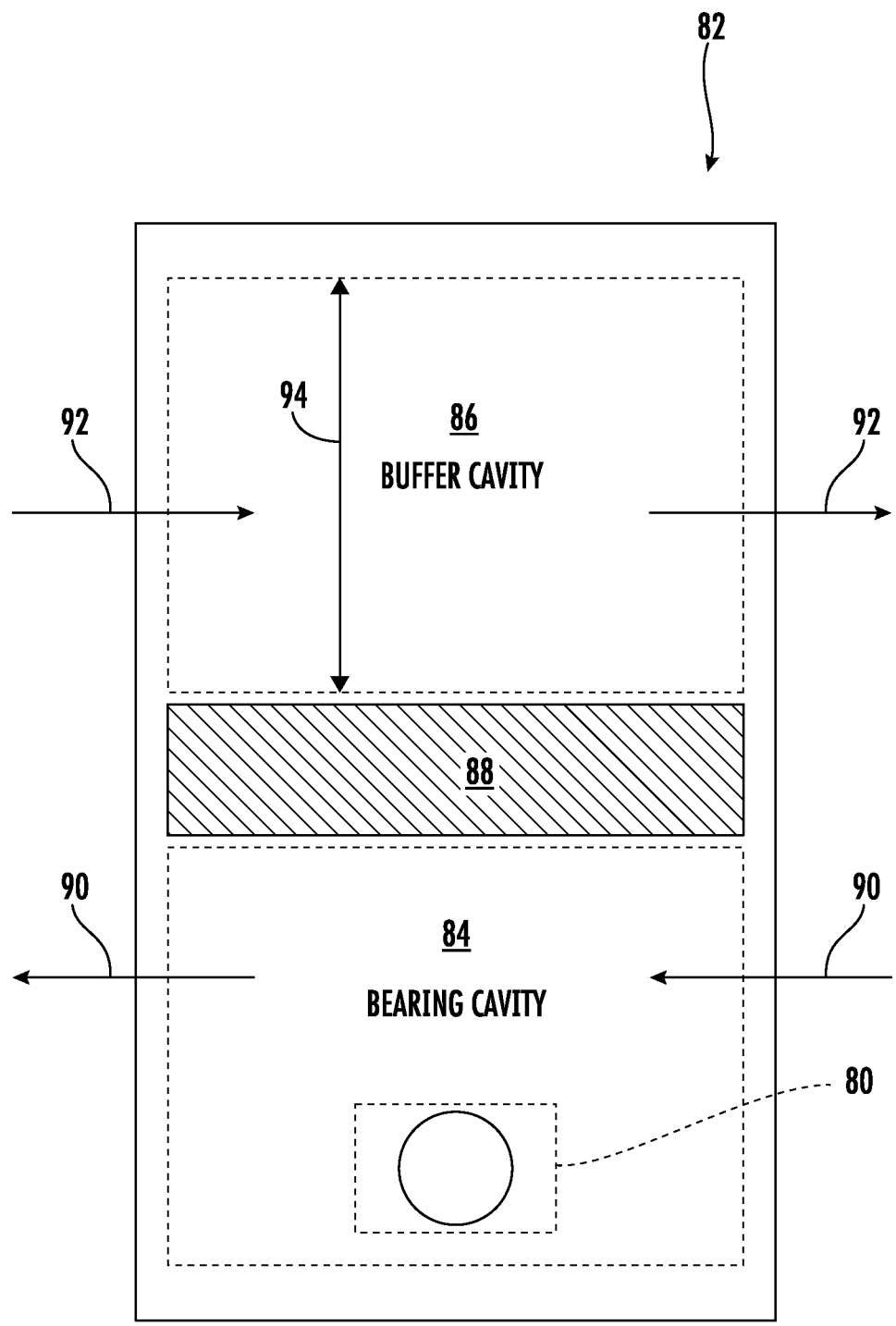
FIG. 2 is a schematic view of an exemplary bearing compartment of a gas turbine engine according to exemplary embodiments of the present disclosure.

FIG. 2 is a schematic view of an exemplary bearing compartment 82 of the turbofan engine 10 according to various embodiments of the present disclosure. In exemplary embodiments, the bearing compartment 82 is used to house one or more respective bearing assemblies 80 which enables smooth rotation of the LP shaft 36 of the turbofan engine 10 (FIG. 1). As shown in FIG. 2, the bearing compartment 82 also houses a bearing cavity 84 and a buffer cavity 86, which are partly separated by seals 88 (only one shown), e.g., carbon/lift-off seals. The bearing cavity 84 may be supplied with a lubricant or lubricating oil 90 to reduce friction. The seals 88 are provided to keep the lubricating oil 90 from leaking from the bearing cavity in operation. The seals 88 are engaged to seal runners (not shown) that are secured to the LP shaft 36 (FIG. 1).

To ensure minimum or zero oil leakage around the seals 88, high pressure compressed air 92 from one or both the LP compressor 22 and the HP compressor 24 of the compressor section 21 is supplied to the buffer cavity 86 to create an air gap 94 at a higher pressure, relative to that of the lubricating oil 90, in the bearing cavity 84. However, since the compressed air 92 is bled-off from the compressor section 21, it is typically supplied at a relatively high temperature, which can reduce lifespan of the seals 88 and other components downstream, potentially resulting in oil leakage.

Referring to FIGS. 1 and 2 collectively, in exemplary embodiments of the present disclosure, the turbofan engine 10 includes a compact shaft-mounted rotatable heat exchanger 200 hereinafter referred to as "rotatable heat exchanger 200". In operation, the rotatable heat exchanger 200 cools the compressed air 92 fed to the buffer cavity 86 and subsequently to the seals 88, using the lubricating oil 90 as a cooling fluid.

Figure 3:
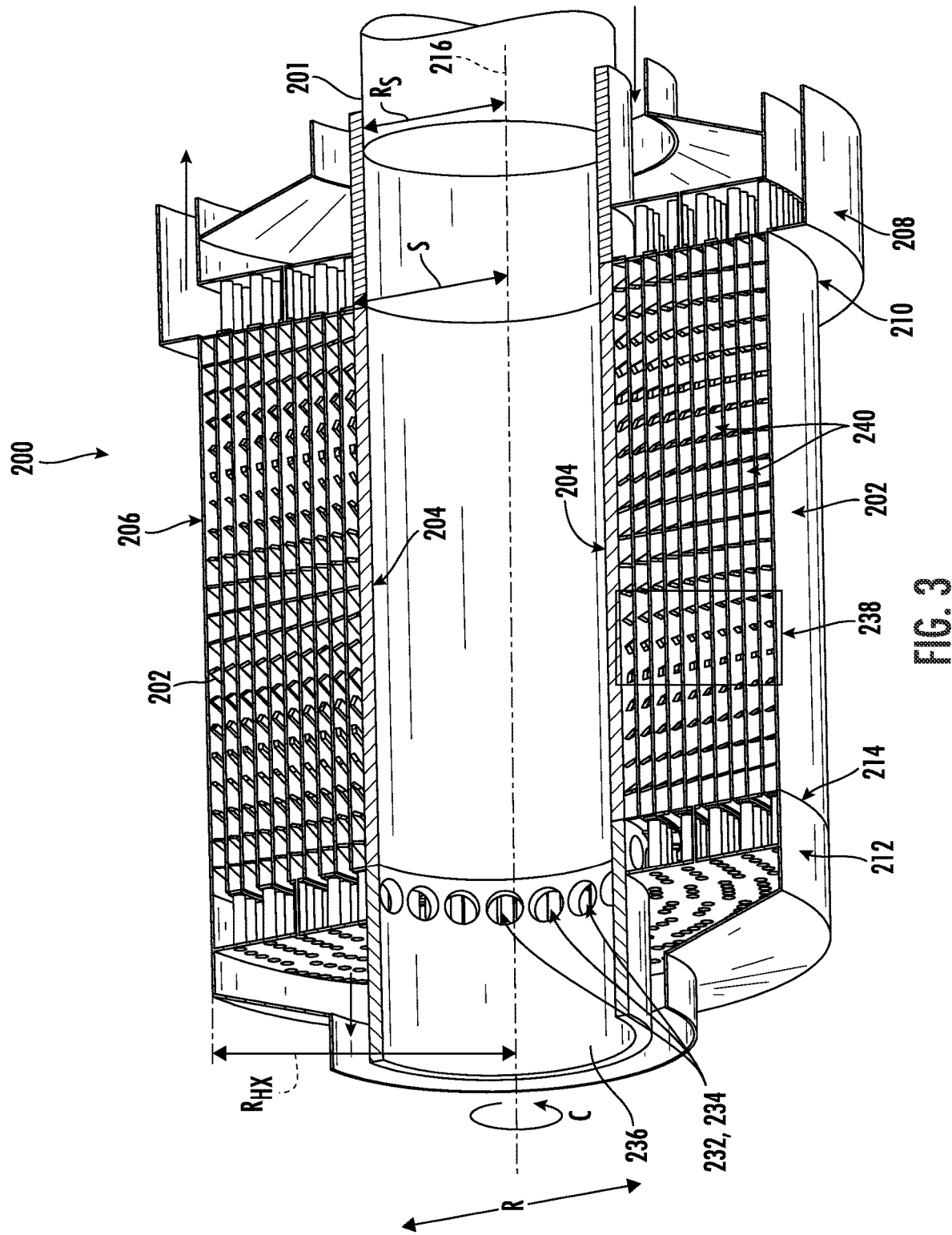
FIG. 3 is a cross-sectional schematic view of an exemplary embodiment of a rotatable heat exchanger according to exemplary embodiments of the present disclosure.
Figure 4:
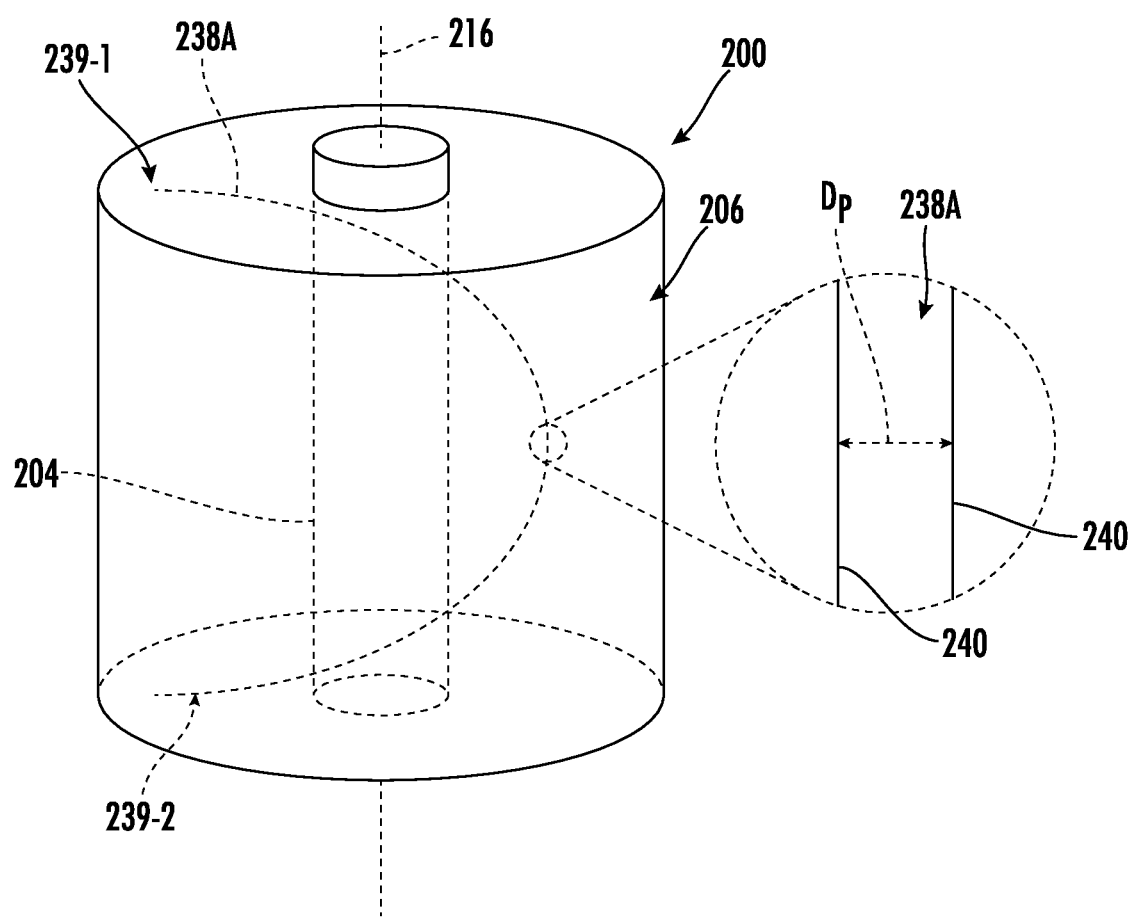
FIG. 4 is a schematic view of an exemplary embodiment of the rotatable heat exchanger of FIG. 3.

FIG. 3 provides a cross-sectioned schematic view of an exemplary embodiment of the rotatable heat exchanger 200 according to exemplary embodiments of the present disclosure. FIG. 4 provides a schematic view of the rotatable heat exchanger 200 of FIG. 3.

As shown in FIGS. 3 and 4, the rotatable heat exchanger 200 includes an outer casing 202 radially spaced from and concentrically aligned with an annular inner casing 204. The annular inner casing 204 and the outer casing 202 at least partially define a core 206 of the rotatable heat exchanger 200. The core 206, and more specifically for the embodiment shown, the outer casing 202, defines a heat exchanger radius ($R_{HX}$) of the core 206 of the rotatable heat exchanger 200.

In exemplary embodiments, the rotatable heat exchanger 200 includes a first manifold assembly 208 at a first end 210 of the core 206. A second manifold assembly 212 is disposed at a second end 214 of the core 206. The first end 210 and the second end 214 of the core 206 are axially spaced apart with respect an axial centerline 216 of the rotatable heat exchanger 200 and/or the longitudinal axis 12 of the turbofan engine 10, as shown in FIG. 1. The first manifold assembly 208 and/or the second manifold assembly 212 may be formed from multiple components assembled together or may be formed as singular bodies using additive manufacturing techniques known in the industry. Forming the components singularly via additive manufacturing provides for reduced weight, fewer connection joints resulting in lees opportunities for leakage, etc.

As discussed, the rotatable heat exchanger 200 is coupled to a shaft 201. More specifically, the first manifold assembly 208, the core 206 and the second manifold assembly 212 are annularly or ring shaped to fit around and be coupled to the shaft 201, which may be one of the LP shaft 36 or the HP shaft 34. The shaft 201 defines a shaft radius ($R_S$). In such a manner, it will be appreciated that the rotatable heat exchanger 200 may be configured to rotate at a rotational speed ($N_S$) in a circumferential direction C equal to a rotational speed of the shaft when the engine is operated at a 100% shaft speed operating condition.

Figure 5:
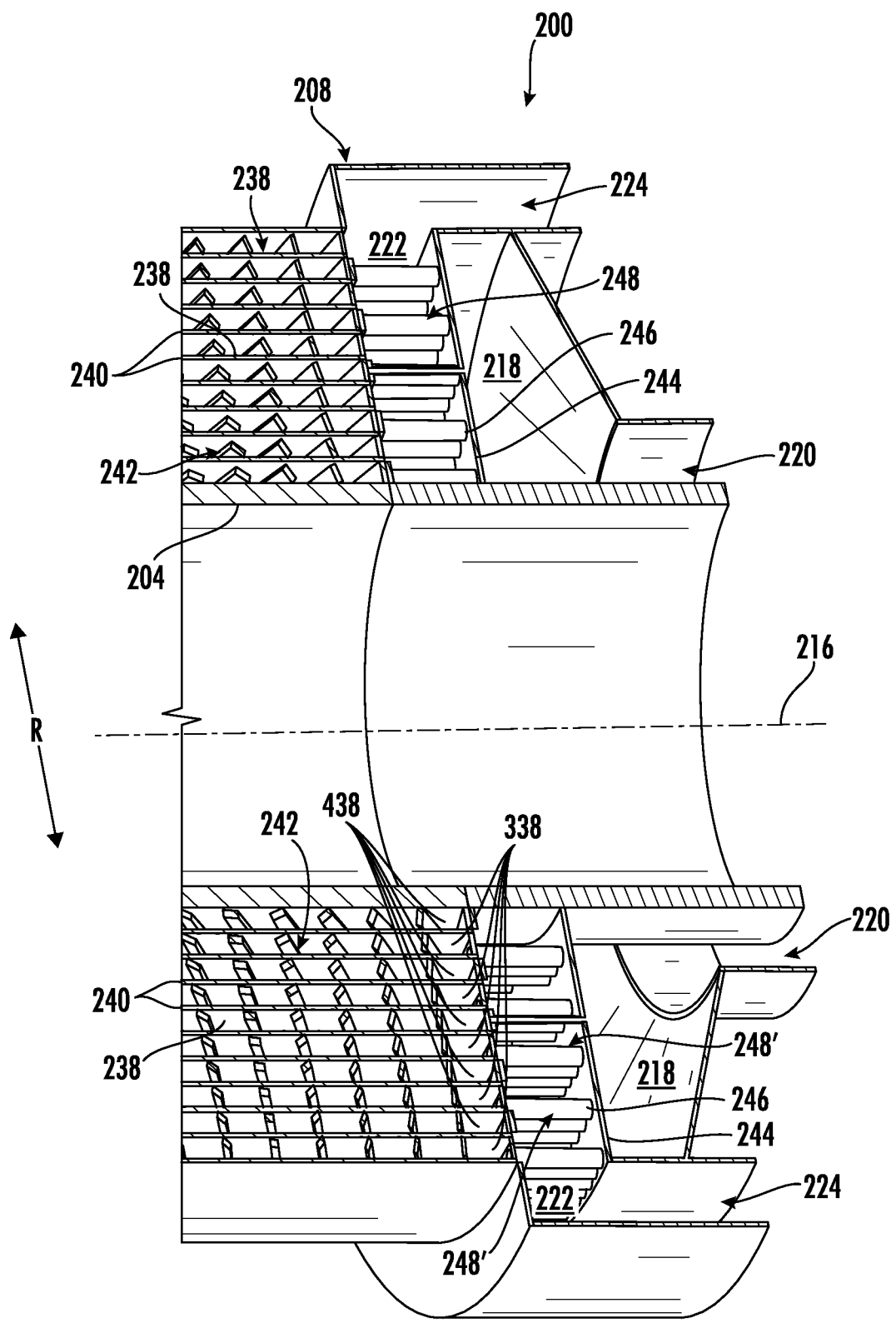
FIG. 5 is an enlarged cross-sectional schematic view of a first end portion of the rotatable heat exchanger including a first manifold assembly as shown in FIG. 3, according to exemplary embodiments of the present disclosure.
Figure 6:
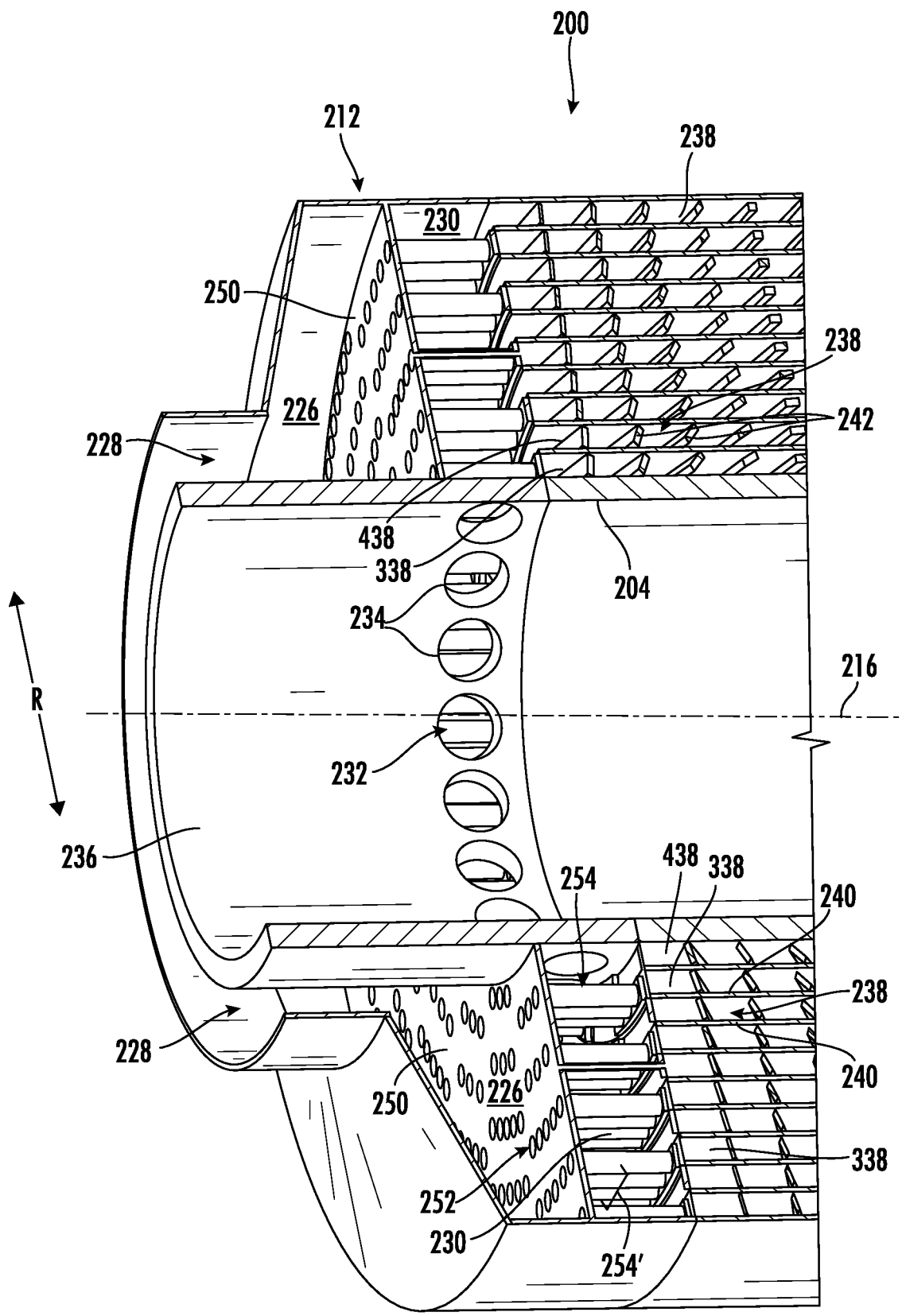
FIG. 6 is an enlarged cross-sectional schematic view of a second end portion of the rotatable heat exchanger including a first manifold assembly as shown in FIG. 3, according to exemplary embodiments of the present disclosure.

FIG. 5 provides an enlarged cross-sectional schematic view of a portion of the rotatable heat exchanger 200 including the first manifold assembly 208 as shown in FIG. 3, according to exemplary embodiments of the present disclosure. FIG. 6 provides an enlarged cross-sectional schematic view of a portion of the rotatable heat exchanger 200 including the second manifold assembly 212 as shown in FIG. 3, according to exemplary embodiments of the present disclosure.

As shown in FIG. 5, the first manifold assembly 208 includes/defines a first-fluid inlet manifold 218. In exemplary embodiments, the first-fluid inlet manifold 218 is annularly shaped. A first-fluid inlet 220 provides for fluid communication into the first-fluid inlet manifold 218. The first manifold assembly 208 further includes a second-fluid outlet manifold 222. In exemplary embodiments, the second-fluid outlet manifold 222 is annularly shaped. A second-fluid outlet 224 provides for fluid communication out of the second-fluid outlet manifold 222.

As shown in FIG. 6, the second manifold assembly 212 includes/defines a first-fluid outlet manifold 226. In exemplary embodiments, the first-fluid outlet manifold 226 is annularly shaped. A first-fluid outlet 228 provides for fluid communication out of the first-fluid outlet manifold 226. The second manifold assembly 212 further includes a second-fluid inlet manifold 230. In exemplary embodiments, the second-fluid inlet manifold 230 is annularly shaped. A second-fluid inlet 232 provides for fluid communication into the second-fluid inlet manifold 230. In certain embodiments the second-fluid inlet 232 may be formed from one or more apertures 234 defined along an inner wall 236 of the second manifold assembly 212 or the annular inner casing 204. The one or more apertures 234 may be circumferentially spaced about the inner wall 236.

As shown in FIGS. 3-6 collectively, the core 206 includes a plurality of helical passages 238 concentrically formed about the annular inner casing 204 and/or axial centerline 216 and stacked radially outwardly from the annular inner casing 204. As shown in FIGS. 5 and 6, each respective helical passage 238 of the plurality of helical passages 238 is formed between a respective pair of radially spaced walls or plates 240. The radially spaced walls or plates 240 may be cylindrically or annularly shape about the annular inner casing 204 and/or the axial centerline 216.

Referring particularly to FIG. 4, the plurality of helical passages 238 includes a first passage 238A. The first passage 238A extends from an inlet 239-1 to an outlet 239-2 and defines a passage length ($L_P$; not labeled) from the inlet 239-1 to the outlet 239-2, which is an average passage length of the first passage 238A. Additionally, as will be appreciated from the Callout A in FIG. 4, the first passage 238A additionally defines a passage hydraulic diameter ($D_P$), which is an average hydraulic diameter of the first passage 238A along the passage length ($L_P$). Briefly, it will further be appreciated that the first passage defines a head loss ($\Delta H_{channel}$) across the first passage 238A, which is an average head loss across the first passage 238A, when the engine is operated at a 100% shaft speed operating condition. As used herein, the term "head loss" refers to a pressure lost by fluid flowing through the first passage 238A as a result of, e.g., turbulence caused by a velocity of the flowing fluid and a roughness of the surfaces forming the first passage 238A.

Figure 7:
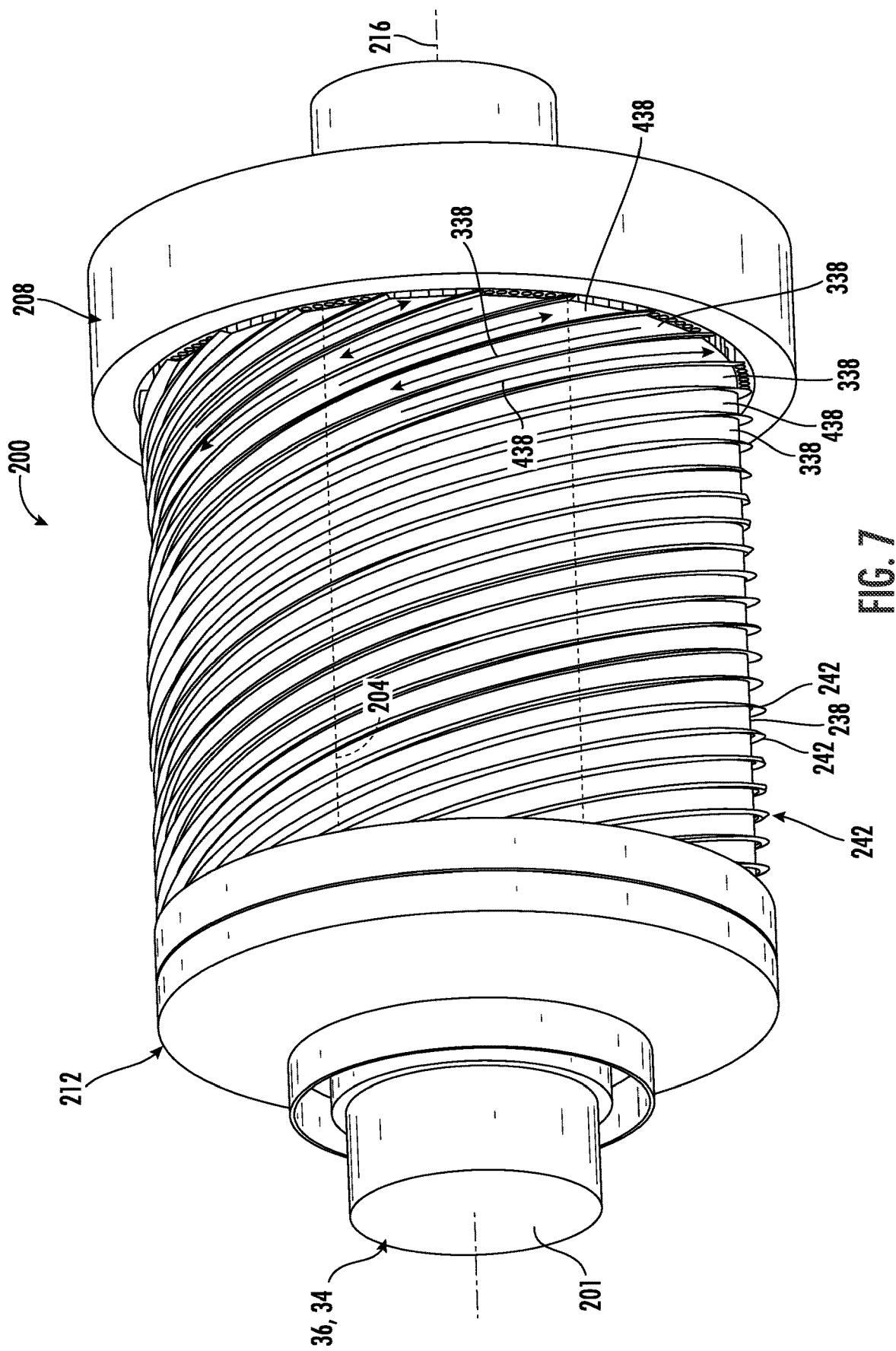
FIG. 7 is a perspective view of a rotatable heat exchanger as shown in FIG. 3, with an outer casing removed for clarity, according to an exemplary embodiment of the present disclosure.

FIG. 7 provides a perspective view of the rotatable heat exchanger 200 as shown in FIG. 3 with the outer casing 202 removed for clarity, according to an exemplary embodiment of the present disclosure. As shown in FIG. 7, the rotatable heat exchanger 200 may be mounted to a shaft(S) such as the $L_P$ shaft 36 or the HP shaft 34. As shown in FIGS. 5 through 7, each helical passage 238 is further formed or defined by a respective pair of helical turning walls 242. As shown in FIG. 7, each helical turning wall 242 and each helical passage 238 of the plurality of helical passages 238 extends helically about the annular inner casing 204 (FIG. 3) and/or the axial centerline 216 (FIG. 7) from the first manifold assembly 208 to the second manifold assembly 212 between a respective pair of radially spaced walls or plates 240 (FIGS. 5 and 6 collectively). Each helical passage 238 is fluidly isolated from an adjacent helical passage 238 between the first manifold assembly 208 and the second manifold assembly 212. In exemplary embodiments, as shown in FIG. 3, the helical passages 238 are all encased between the annular inner casing 204 and the outer casing 202.

In various embodiments, each helical passage 238 may make one or more complete turns about the annular inner casing 204 between the first manifold assembly 208 and the second manifold assembly 212. For example, in one embodiment, as shown in FIG. 7, each helical passage 238 makes one complete turn about the annular inner casing 204 (shown in hidden lines) between the first manifold assembly 208 and the second manifold assembly 212. In other embodiments, the helical passages 238 make two or more complete turns about the annular inner casing 204 between the first manifold assembly 208 and the second manifold assembly 212.

In various embodiments, as shown in FIGS. 5 through 7 collectively, the plurality of helical passages 238 includes a plurality of first-fluid passages 338 and a plurality of second-fluid passages 438. Each first-fluid passage 338 of the plurality of first-fluid passages 338 is fluidly isolated from each second-fluid passage 438. However, each first-fluid passage 338 is in thermal communication with adjacent (radially and circumferentially) second-fluid passages 438. As such, thermal energy/heat may be transferred between two fluids flowing respectively through the first-fluid passages 338 and the second-fluid passages 438.

In exemplary embodiments, as shown in FIGS. 5 and 6, the plurality of helical passages 238 are arranged circumferentially around and radially outwardly from the annular inner casing 204. The individual first-fluid passages 338 of the plurality of first-fluid passages 338 and the individual second-fluid passages 438 of the plurality of second-fluid passages 438 are arranged or disposed in an alternating pattern both circumferentially and radially about the annular inner casing 204. In this configuration, each first-fluid passage 338 of the plurality of first-fluid passages 338 is surrounded on at least three sides by three or more second-fluid passages 438 of the plurality of second-fluid passages 438.

Referring now to FIG. 5, in exemplary embodiments, the first manifold assembly 208 includes a wall or plate 244 which fluidly isolates the first-fluid inlet manifold 218 from the second-fluid outlet manifold 222. The plate 244 includes or defines a plurality of through-holes or apertures 246. The first manifold assembly 208 further includes a plurality of conduits or tubes 248. Each tube 248 of the plurality of tubes 248 is aligned with a respective aperture 246 of the plurality of apertures 246. In exemplary embodiments, the plurality of tubes 248 are arranged in sets or groups. Each set of tubes 248' of the plurality of tubes 248 is arranged to align with and provide for fluid flow into a corresponding first-fluid passage 338 of the plurality of first-fluid passages 338. Each set or group of tubes 248' extends from the plate 244, and through the second-fluid outlet manifold 222.

Figure 8:
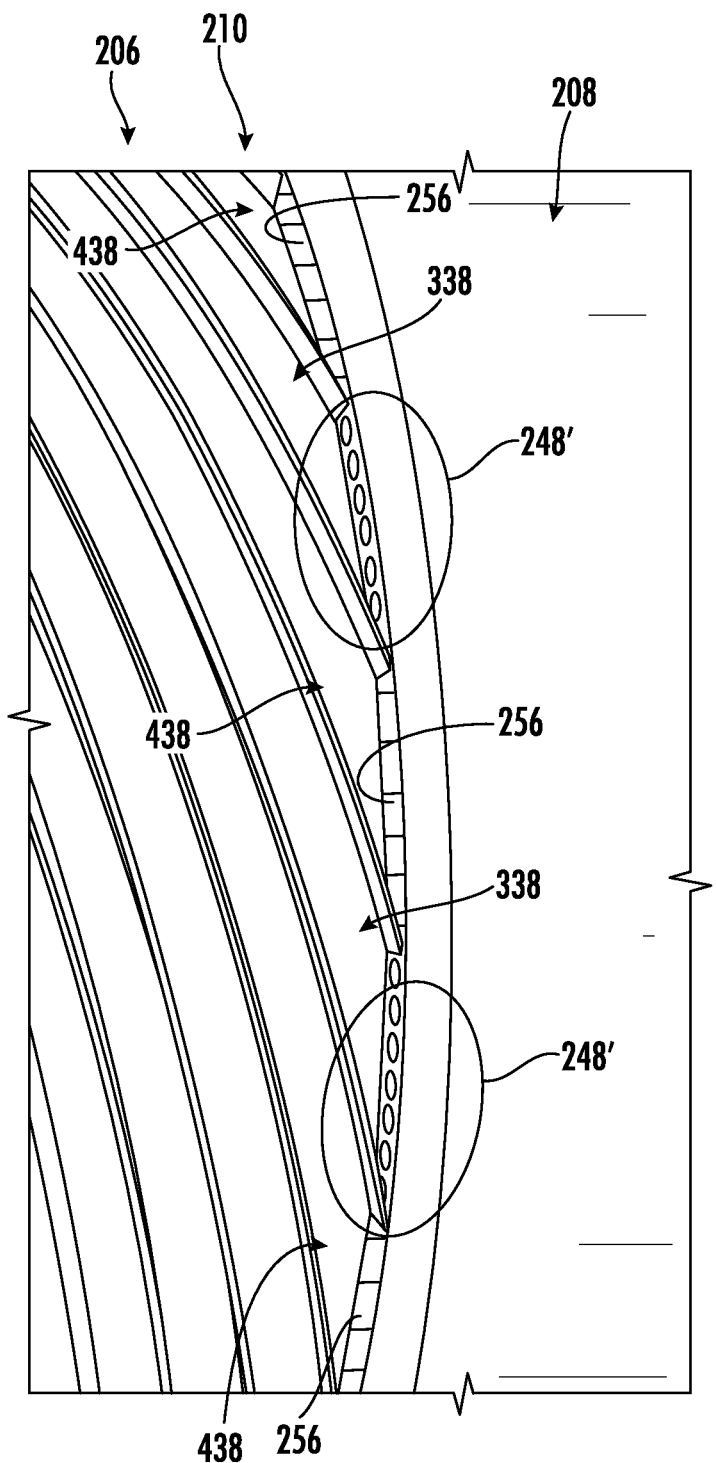
FIG. 8 is an enlarged view of a portion of a first end of a core of the rotatable heat exchanger with an outer casing removed and a first manifold assembly attached, according to exemplary embodiments of the present disclosure.

FIG. 8 provides an enlarged view of a portion of the first end 210 of the core 206 with the outer casing 202 removed and the first manifold assembly 208 attached, according to exemplary embodiments of the present disclosure. As shown in FIGS. 5 and 8 collectively, each respective set of tubes 248' of the first manifold assembly 208 is fluidly coupled to a corresponding first-fluid passage 338. As further shown in FIGS. 5 and 8 collectively, the second-fluid outlet manifold (FIG. 5) is open to and in fluid communication with each respective second-fluid passage 438 via respective openings 256 defined in the first manifold assembly 208. In exemplary embodiments, each opening 256 is circumferentially separated by a respective set of tubes 248'.

Referring now to FIG. 6, in exemplary embodiments, the second manifold assembly 212 includes a wall or plate 250 which fluidly isolates the first-fluid outlet manifold 226 from the second-fluid inlet manifold 230. The plate 250 includes or defines a plurality of through-holes or apertures 252. The second manifold assembly 212 further includes a plurality of conduits or tubes 254. Each tube 254 of the plurality of tubes 254 is aligned with a respective aperture 252 of the plurality of apertures 252 defined in plate 250. In exemplary embodiments, the plurality of tubes 254 are arranged circumferentially in sets or groups of tubes 254'. Each set of tubes 254' of the plurality of tubes 254 is arranged to align with and provide for fluid flow into a corresponding first-fluid passage 338 of the plurality of first-fluid passages 338. Each set or group of tubes 254' extends from the plate 250, and through the second-fluid inlet manifold 230.

Figure 9:
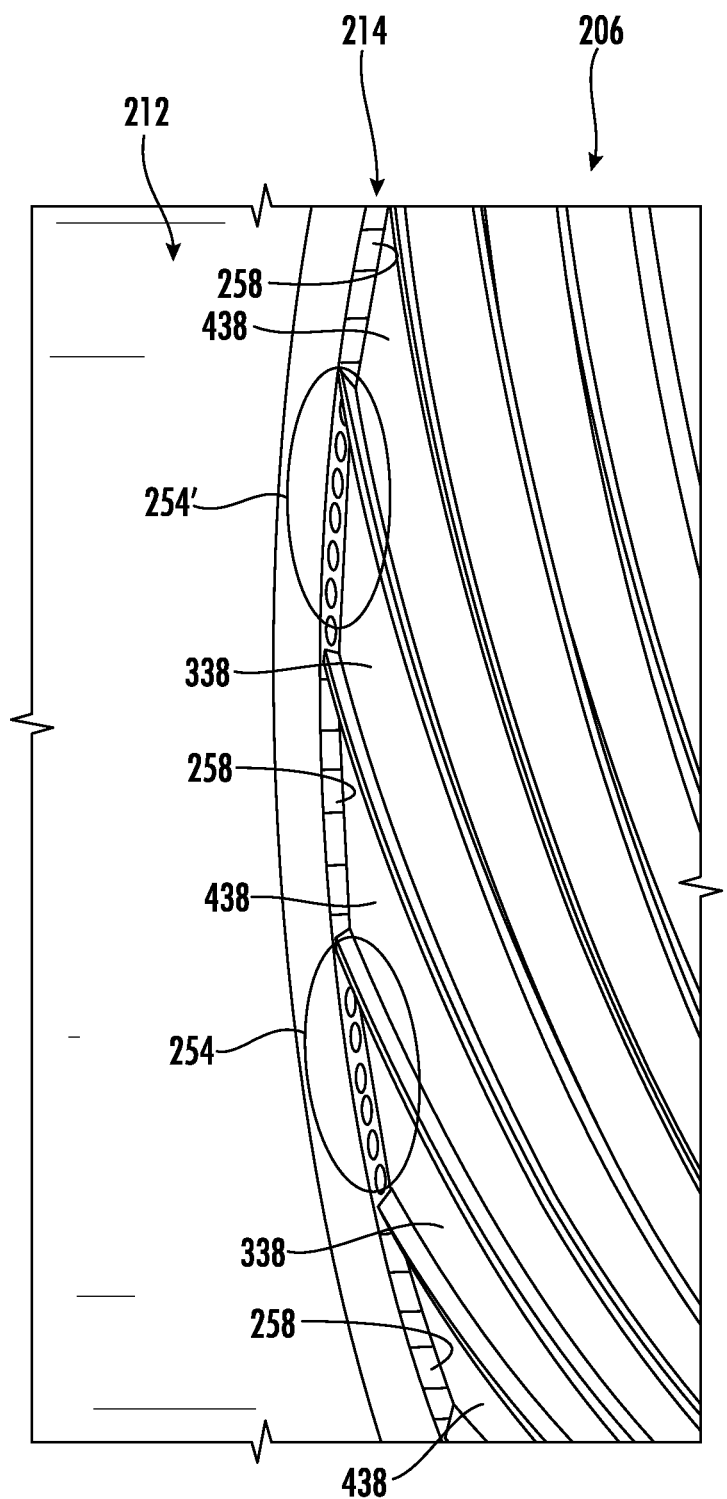
FIG. 9 is an enlarged view of a portion of a second end of a core of the rotatable heat exchanger with an outer casing removed and a second manifold assembly attached, according to exemplary embodiments of the present disclosure.

FIG. 9 provides an enlarged view of a portion of the second end 214 of the core 206 with the outer casing 202 removed and the second manifold assembly 212 attached, according to exemplary embodiments of the present disclosure. As shown in FIG. 9, each tube 254 of a respective set of tubes 254' is fluidly coupled to a corresponding first-fluid passage 338. As further shown in FIG. 9, the second-fluid inlet manifold (FIG. 6) is open to and in fluid communication with each respective second-fluid passage 438 via respective openings 258 defined in the second manifold assembly 212. In exemplary embodiments, each opening 258 is circumferentially separated by a respective set of tubes 254'.

Figure 10:
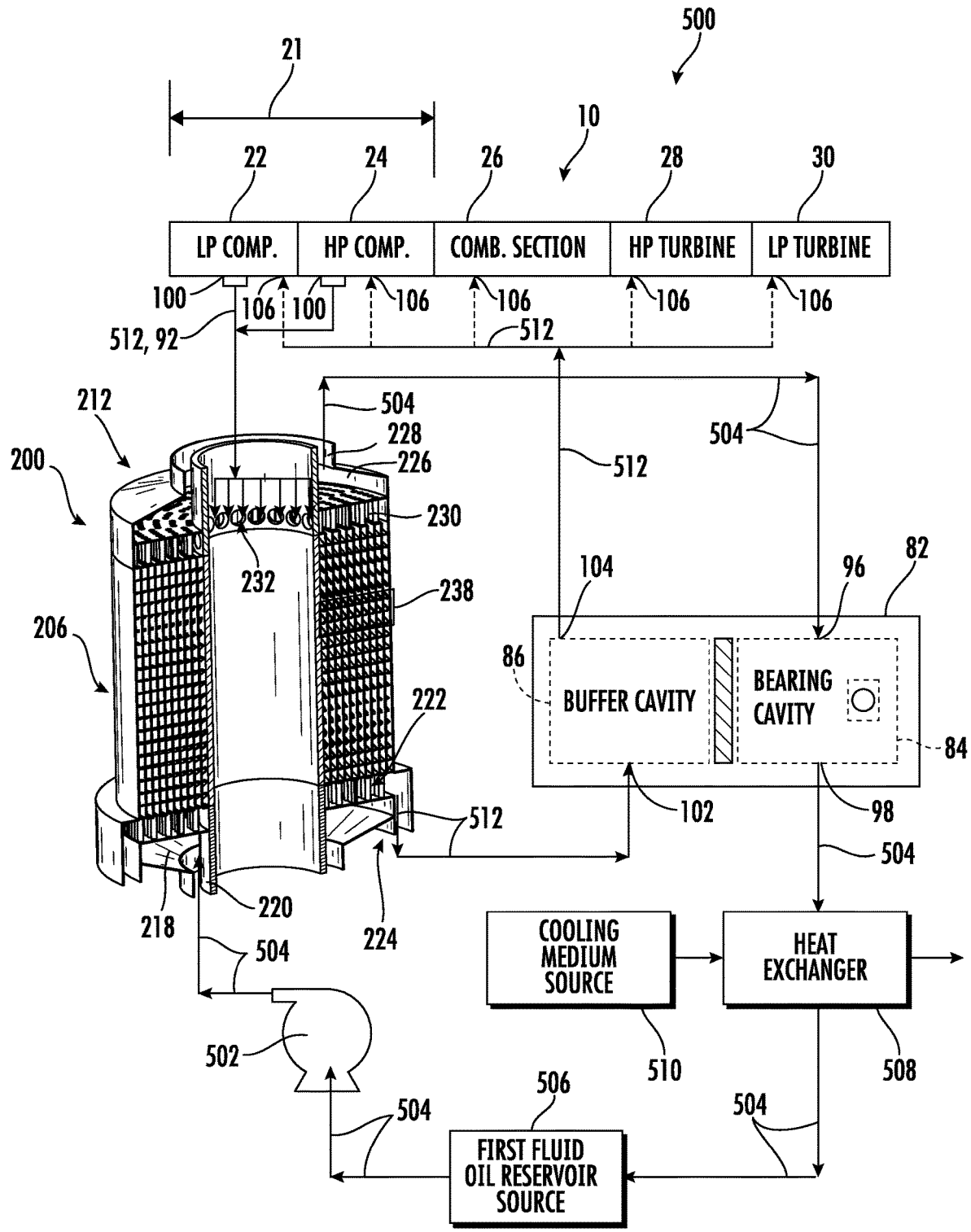
FIG. 10 a schematic of a bearing cooling system according to an exemplary embodiment of the present disclosure.

FIG. 10 provides a schematic of a bearing cooling system 500 according to an exemplary embodiment of the present disclosure. As shown in FIG. 10, the bearing cooling system 500 includes the rotatable heat exchanger 200 as illustrated in FIGS. 3-9, and the bearing compartment 82, as illustrated in FIG. 2. In particular embodiments, the bearing cooling system 500 includes a compressor or pump 502. The pump 502 is suitable to pump a heat transfer fluid/first-fluid (indicated as arrows 504) such as oil or other suitable coolant from a first-fluid source 506 such as an oil reservoir to the first-fluid inlet 220 of the first-fluid inlet manifold 218 via pipes, conduits, and/or fluid couplings. The first-fluid outlet 228 of the first-fluid outlet manifold 226 is fluidly coupled to an inlet 96 of the bearing cavity 84 of the bearing compartment 82. An outlet 98 of the bearing cavity 84 is fluidly coupled to the first-fluid source 506. In particular embodiments, a heat exchanger 508 may be positioned downstream from the outlet 98 of the bearing cavity 84 such that the first fluid 504 passes through the heat exchanger 508 upstream from the first-fluid source 506. The heat exchanger 508 may be fluidly coupled to a cooling medium source 510.

In the embodiment shown in FIG. 10, the compressor section 21 is fluidly coupled to the second-fluid inlet manifold 230 via the second-fluid inlet 232 for providing a second fluid as indicated by arrows 512, such as the HP compressed air 92, from the compressor section 21 to the second manifold assembly 212 of the rotatable heat exchanger 200. The second-fluid inlet 232 may be fluidly coupled to one or more stages of the $L_P$ compressor 22, the HP compressor 24, or to one or more stages of both the $L_P$ compressor 22 and the HP compressor 24 via one or more compressor extraction passages or ports 100.

The second-fluid outlet manifold 222 is fluidly coupled to an inlet 102 of the buffer cavity 86 of the bearing compartment 82 via the second-fluid outlet 224 for providing the second fluid 512 to the buffer cavity 86. In exemplary embodiments, an outlet 104 of the buffer cavity 86 is fluidly coupled to the turbofan engine 10 at one or more connection points 106 that are downstream from the compressor extraction ports 100 to return the second fluid 512 back to the turbofan engine 10. For example, the second fluid 512 may be routed back to the turbofan engine 10 at a later compressor stage of the compressor section 21 than the extraction port 100. In other embodiments, the outlet 104 of the buffer cavity 86 is fluidly coupled to some other portion of the turbofan engine 10 that located fluidly downstream from the compressor section 21 and the extraction ports 100, such as the combustion section 26, the HP turbine 28, the $L_P$ turbine 30, or to an auxiliary compressor (not shown), axillary system, or turbine (not shown).

In operation, the rotatable heat exchanger 200 rotates with the $L_P$ shaft 36 (FIG. 1). The first fluid 504 flows from the first-fluid source 506 via the pump 502 into the first-fluid inlet manifold 218 via the first-fluid inlet 220. The first fluid 504 flows through the respective sets of tubes 248' of the first manifold assembly 208, and into respective first-fluid passages 338 of the plurality of helical passages 238. The first fluid 504 flows helically through the respective first-fluid passages 338 about the annular inner casing 204 from the first end 210 of the core 206 to the second end 214 of the core 206, into respective sets of tubes 254' of the second manifold assembly 212, and then into the first-fluid outlet manifold 226.

As is discussed elsewhere herein, a geometry of the first-fluid passages 338 may influence a size of the pump 502 needed to provide a desired fluid flow through the rotatable heat exchanger 200. For example, when the first-fluid passages 338 are long and narrow, and define a relative high head loss during operation, the pump 502 may need to be larger to overcome the fluidic resistance through the first-fluid passages 338. By contrast, for embodiments where the passages are short and wide, and define a relatively low head loss during operation, the pump 502 may be smaller while still providing a desired fluid flow.

The first fluid 504 then flows out of the first-fluid outlet manifold 226 via the first-fluid outlet 228 to the inlet 96 of the bearing cavity 84, thereby providing cooling to one or more bearing assemblies 80 (one bearing assembly shown). The first fluid 504 exits the bearing cavity 84 from the outlet 98 and flows back to the first-fluid source 506. In particular embodiments, the first fluid 504 may flow through the heat exchanger 508 (when present) to cool the first fluid 504 before it is routed back to the first-fluid source 506. The first fluid 504 is cooler than the second fluid 512 between the first-fluid source 506 and the bearing cavity 84.

The second fluid 512 (HP compressed air) flows from one or more of the extraction ports 100 into the second-fluid inlet manifold 230 via the second-fluid inlet 232. The second fluid 512 flows across the respective sets of tubes 254' of the second manifold assembly 212 thereby transferring thermal energy/heat from the second fluid 512 to the first fluid 504. The second-fluid 512 then flows into respective second-fluid passages 438 of the plurality of helical passages 238. Additional thermal energy/heat is transferred from the second fluid 512 to the first fluid 504 as the second fluid 512 flows helically about the annular inner casing 204 within the respective second-fluid passages 438 from the second end 214 of the core 206 to the first end 210 of the core 206 in a counterflow orientation with respect to the flow direction of the first fluid 504 flowing through the first-fluid passages 338.

The second fluid 512 then flows into the second-fluid outlet manifold 222 and across the respective sets of tubes 248' of the first manifold assembly 208 resulting in further heat transfer from the second fluid 512 to the first fluid 504. The second fluid 512 is then routed out of the second-fluid outlet manifold 222 via the second-fluid outlet 224, to the buffer cavity 86 to provide the air gap 94 and to pressurize the seal(s) 88 (one shown) between the buffer cavity 86 and the bearing cavity. The second fluid 512 exits the buffer cavity 86 from the outlet 104 and flows back to the turbofan engine 10. The second fluid 512 may be routed back to the turbofan engine 10 at a later compressor stage of the compressor section 21 than the extraction port 100. For example, the second fluid 512 may be routed from the outlet 104 of the buffer cavity 86 to one or more of the combustion section 26, the HP turbine 28, or the $L_P$ turbine 30 where the second fluid 512 may be used for cooling various engine components or for primary or secondary combustion.

The net result of the thermal interaction between the first fluid 504 and the second fluid 512 as they enter and exit the rotatable heat exchanger 200 is that the temperature of the first fluid 504 increases between the first-fluid inlet 220 and the first-fluid outlet 228 and the temperature of the second fluid 512 decreases between the second-fluid inlet 232 and the second-fluid outlet 224. The helical shape of the first-fluid passages 338 and the second-fluid passages 438 increases the time provided for heat transfer to occur between the two fluids. In addition, alternating the first-fluid passages 338 and the second-fluid passages 438 circumferentially and radially further increases heat transfer between the two fluids 504, 512. Also, heat transfer between the first fluid 504 and second fluid 512 is further enhanced by the centrifugal force acting on both fluids, induced by rotation of the rotatable heat exchanger 200. The centrifugal force enhances flow turbulence and buoyancy effects, which increases heat transfer.

In other embodiments (not illustrated), the rotatable heat exchanger 200 is configured to enable same flow direction (or co-flow direction) between the first fluid 504 and second fluid 512. In this configuration the first-fluid inlet manifold 218, the first-fluid inlet 220, the second-fluid inlet manifold 230, and the second-fluid inlet 232 are both defined in one of the first or second manifold assemblies 208, 212 while the first-fluid outlet manifold 226, the first-fluid outlet 228, the second-fluid outlet manifold 222, and the second-fluid outlet 224 are both defined in the other of the of the first or second manifold assemblies 208, 212.

Figure 11:
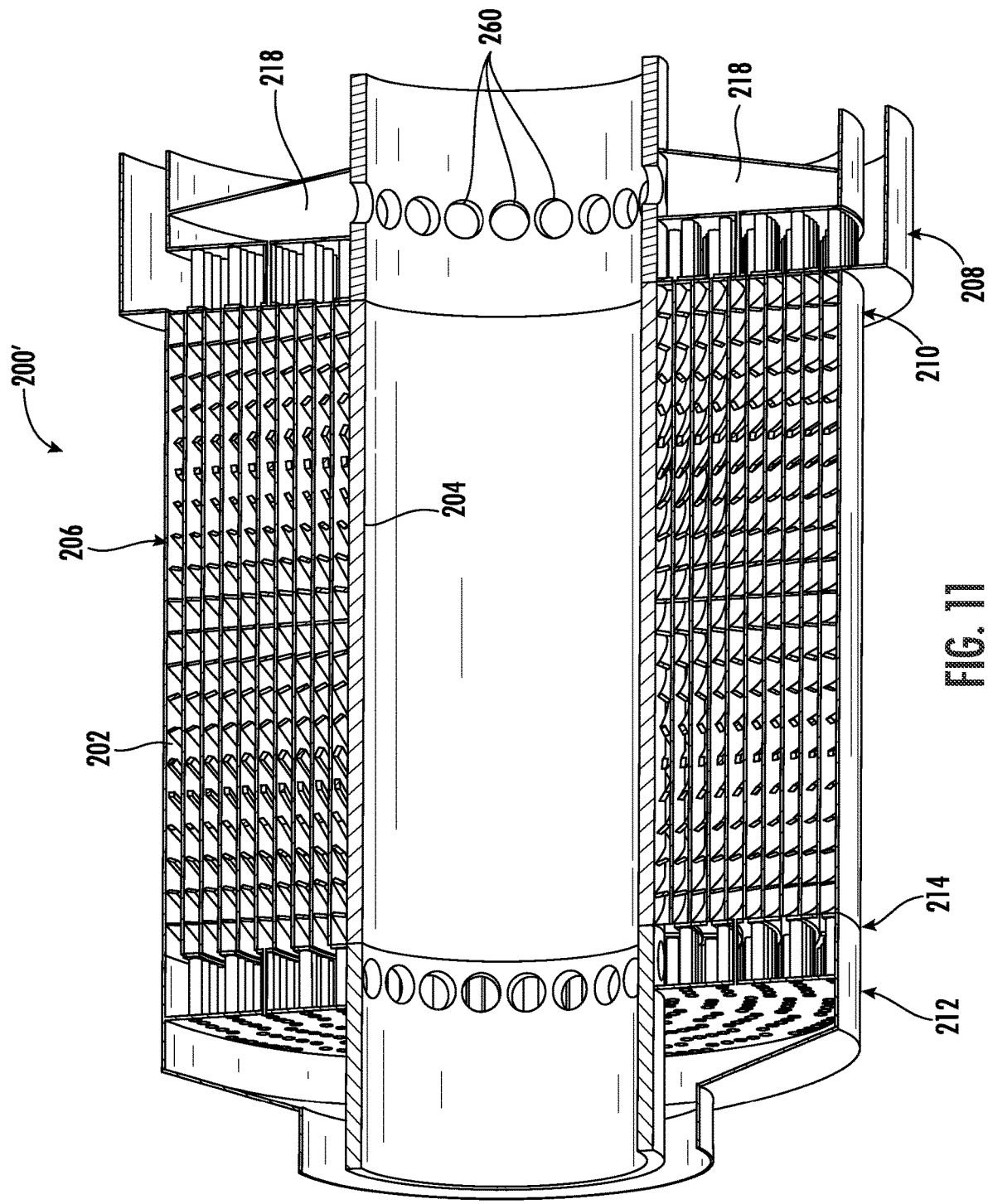
FIG. 11 is a cross-sectional schematic view of an alternate embodiment of a rotatable heat exchanger, according to exemplary embodiments of the present disclosure.

FIG. 11 provides a cross-sectional schematic view of an alternate embodiment of the rotatable heat exchanger 200 as shown in FIGS. 1-10, according to the present disclosure. In exemplary embodiments, as shown in FIG. 11, the first-fluid inlet 220 is defined by a plurality of apertures 260 which provide for fluid communication into the first-fluid inlet manifold 218.

Figure 12:
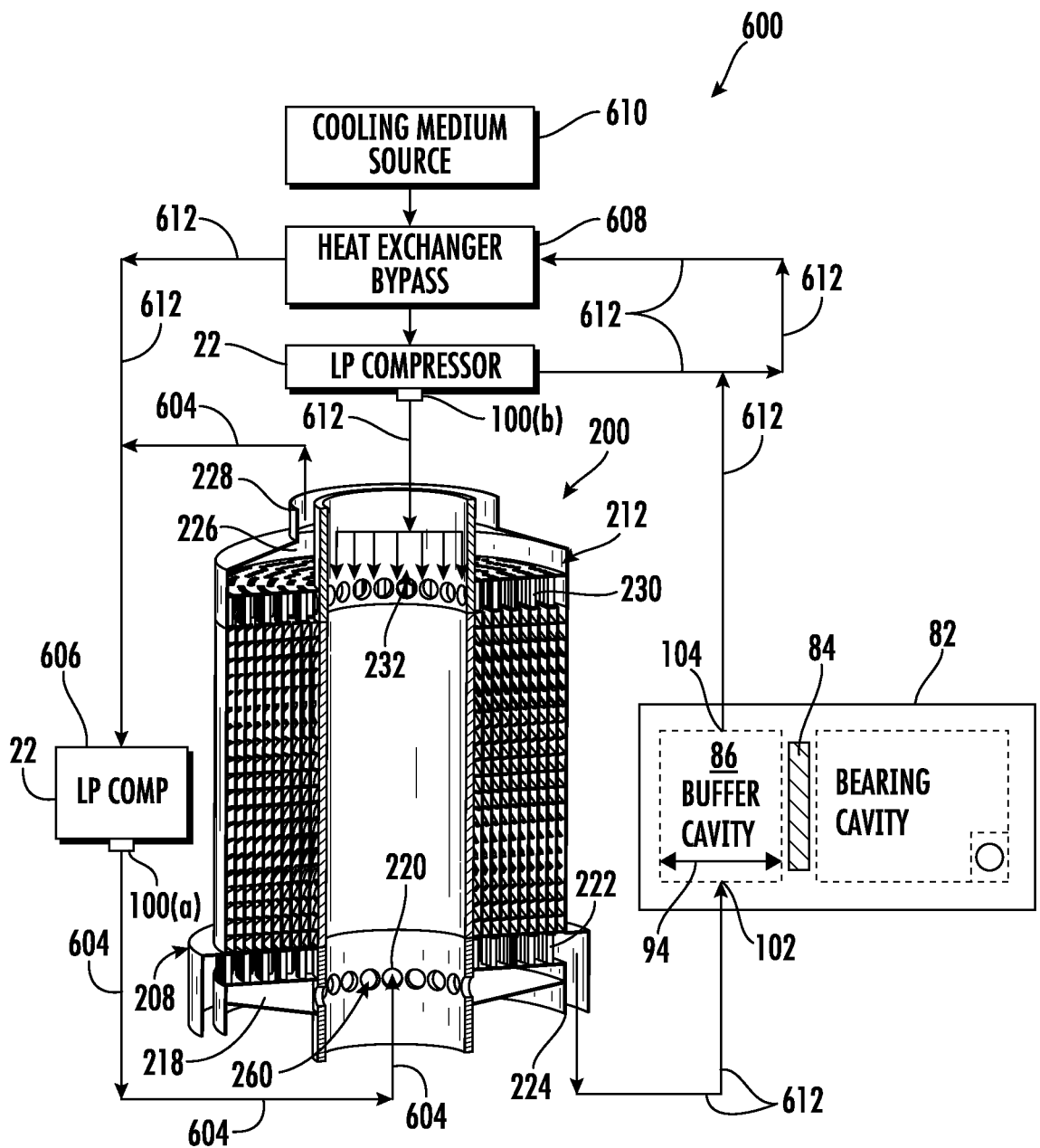
FIG. 12 a schematic of a bearing cooling system according to an exemplary embodiment of the present disclosure.

FIG. 12 provides a schematic of a bearing cooling system 600 according to an exemplary embodiment of the present disclosure. As shown in FIG. 12, the bearing cooling system 600 includes the rotatable heat exchanger 200 as illustrated in FIG. 11, and the bearing compartment 82, as illustrated in FIG. 2. In this embodiment the apertures 260 of the first-fluid inlet 220 are fluidly coupled to a first-fluid source 606 such as an early-stage extraction port 100(a) of the $L_P$ compressor 22 (e.g. stages 1 or 2 of the $L_P$ compressor 22) for providing a first fluid 604 to the first-fluid inlet manifold 218. The first-fluid outlet 228 fluidly couples the first-fluid outlet manifold 226 back to the $L_P$ compressor 22.

The second-fluid inlet 232 is fluidly coupled to a later stage extraction port 100(b) of the $L_P$ compressor 22 to provide a second-fluid 612 to the second-fluid inlet manifold 230. The second-fluid outlet 224 fluidly couples the second-fluid outlet manifold 222 to the inlet 102 of the buffer cavity 86 of the bearing compartment 82. The outlet 104 fluidly couples the buffer cavity back to the $L_P$ compressor 22. In particular embodiments, the bearing cooling system 600 includes a heat exchanger 608 and a cooling medium source 610. In this configuration, at least a portion of the second-fluid 612 may be routed through the heat exchanger 200 and routed back to the $L_P$ compressor 22.

In operation, as shown in FIGS. 1-9 and 11-12 collectively, the rotatable heat exchanger 200 rotates with the $L_P$ shaft 36. The first fluid 604 flows from the first-fluid source 606 into the first-fluid inlet manifold 218 via the first-fluid inlet 220 or apertures 260. The first fluid 604 flows through the respective sets of tubes 248' of the first manifold assembly 208, and into respective first-fluid passages 338 of the plurality of helical passages 238. The first fluid 604 flows helically through the respective first-fluid passages 338 about the annular inner casing 204 from the first end 210 of the core 206 to the second end 214 of the core 206, into respective sets of tubes 254' of the second manifold assembly 212, and then into the first-fluid outlet manifold 226. The first fluid 504 then flows out of the first-fluid outlet manifold 226 via the first-fluid outlet 228 and back to the first-fluid source 606 or $L_P$ compressor 22. The first fluid 604 is cooler than the second fluid 612.

The second fluid 612 flows from the later stage extraction port 100(b) of the $L_P$ compressor 22 or from a stage in the HP compressor 24 into the second-fluid inlet manifold 230 via the second-fluid inlet 232. The second fluid 612 flows across the respective sets of tubes 254' of the second manifold assembly 212 thereby transferring thermal energy/heat from the second fluid 612 to the first fluid 604. The second-fluid 612 then flows into respective second-fluid passages 438 of the plurality of helical passages 238. Additional thermal energy/heat is transferred from the second fluid 612 to the first fluid 604 as the second fluid 612 flows helically about the annular inner casing 204 within the respective second-fluid passages 438 from the second end 214 of the core 206 to the first end 210 of the core 206 in a counterflow orientation with respect to the flow direction of the first fluid 604 flowing through the first-fluid passages 338.

The second fluid 612 then flows into the second-fluid outlet manifold 222 and across the respective sets of tubes 248' of the first manifold assembly 208 resulting in further heat transfer from the second fluid 612 to the first fluid 604. The second fluid 612 is then routed out of the second-fluid outlet manifold 222 via the second-fluid outlet 224, to the buffer cavity 86 to provide the air gap 94 and to pressurize the seal(s) 88 (one shown) between the buffer cavity 86 and the bearing cavity. The second fluid 612 exits the buffer cavity 86 from the outlet 104 and flows back to the $L_P$ compressor 22. The second fluid 612 may be routed back to the turbofan engine 10 at a later compressor stage of the compressor section 21 than the extraction port 100(b). For example, the second fluid 612 may be routed from the outlet 104 of the buffer cavity 86 to one or more of the combustion section 26, the HP turbine 28, or the $L_P$ turbine 30 where the second fluid 512 may be used for cooling various engine components or for primary or secondary combustion. In an exemplary embodiment, at least a portion of the second fluid 612 may be routed through the heat exchanger 608 for cooling or for further heating before being routed back the $L_P$ compressor 22 or to some other engine system or component.

Again, the net result of the thermal interaction between the first fluid 604 and the second fluid 612 as they enter and exit the rotatable heat exchanger 200 is that the temperature of the first fluid 604 increases between the first-fluid inlet 220 and the first-fluid outlet 228 and the temperature of the second fluid 612 decreases between the second-fluid inlet 232 and the second-fluid outlet 224. As previously described, the helical shape of the first-fluid passages 338 and the second-fluid passages 438 increases the time provided for heat transfer to occur between the two fluids. In addition, alternating the first-fluid passages 338 and the second-fluid passages circumferentially and radially further increases heat transfer between the two fluids. Also, heat transfer between the first fluid 604 and second fluid 612 is further enhanced by the centrifugal force acting on both fluids, induced by rotation of the rotatable heat exchanger 200. The centrifugal force enhances flow turbulence and buoyancy effects, which increases heat transfer.

In other embodiment (not illustrated), the rotatable heat exchanger 200 enables same flow direction (or co-flow direction) between the first fluid 604 and second fluid 612. In this configuration the first-fluid inlet manifold 218, the first-fluid inlet 220, the second-fluid inlet manifold 230, and the second-fluid inlet 232 are both defined in one of the first or second manifold assemblies 208, 212 while the first-fluid outlet manifold 226, the first-fluid outlet 228, the second-fluid outlet manifold 222, and the second-fluid outlet 224 are both defined in the other of the of the first or second manifold assemblies 208, 212.

As alluded to earlier, the inventor discovered, unexpectedly during the course of rotatable heat exchanger and gas turbine engine design—i.e., designing gas turbine engines having a rotatable heat exchanger coupled to a shaft of a turbomachine with various amounts of airflow available to the rotatable heat exchanger, with a variety of geometric ratios of the passages through the heat exchanger, and operable at various rotational speeds, and evaluating an overall engine and heat exchanger performance-a significant relationship exists between the amount of airflow available to the rotatable heat exchanger, a geometric ratio of the passages through the heat exchanger, and a rotational speed of the heat exchanger. The relationship represents an indicator of the ability of a gas turbine engine and rotatable heat exchanger to be able to reject a desired amount of heat from a fluid efficiently when the rotatable heat exchanger is operated at an expected rotational speed, without becoming too difficult to control or being of a design that is too difficult to manufacture.

The relationship applies to a gas turbine engine having a fan and a turbomachine, and defining a bypass ratio of airflow from the fan over the turbomachine to airflow through an inlet of the turbomachine. The relationship ties the amount of airflow available to the rotatable heat exchanger (as represented by the bypass ratio and a radius of the fan) to a geometric ratio of a passage through the heat exchanger and centrifugal force on the fluid when the rotatable heat exchanger, as described in more detail below.

In particular, the inventor discovered that inclusion of a larger fan with a smaller bypass ratio can lead to an increase in airflow available to the rotatable heat exchanger, which may improve an effectiveness of the rotatable heat exchanger. Further, an increase in a length to width ratio of the passages through the heat exchanger, as well as a head loss across each passage, may lead to an increase in heat transfer, creating a more power dense heat exchanger having a greater heat transfer capacity, at least in part due to the increase in surface area for each channel. Further, still, an increase in a centrifugal force acting on the fluid when the rotatable heat exchanger is operating at an expected rotational speed may assist in driving the flow through the heat exchanger.

However, the inventor of the present disclosure found that by bounding the relationship of the above-noted parameters on an upper end, the rotatable heat exchanger may achieve the above-noted benefits without being prohibitively difficult to control or operate and without being prohibitively difficult to manufacture. In particular, the inventor found that by limiting the length to width ratio of the passages of the heat exchanger, the heat exchanger may be manufactured in a sufficiently durable manner; by limiting the head loss across each channel, the fluid may be provided through the channels using an acceptable amount of energy (e.g., without having to size up one or more pumps for the heat transfer fluid more than desired; see, e.g., pump 502 in FIG. 10); and by limiting the centrifugal force on the fluid and rotatable heat exchanger, and thus the rotational speed of the rotatable heat exchanger, the fluid may flow through the heat exchanger in a controlled manner and the rotatable heat exchanger may be less susceptible to structural issues during operation. The rotatable heat exchanger may be coupled to an $L_P$ shaft to limit the speed in such a manner.

Moreover, the inventor of the present disclosure found that by bounding the relationship of the above-noted parameters on a lower end, the rotatable heat exchanger may further avoid the above-noted deficiencies while exhibiting enough heat rejection capacity to provide a net benefit to the gas turbine engine, despite an increase in weight for the engine and drag on the shaft.

The relationship discovered, infra, can therefore identify an improved engine and rotatable heat exchanger configuration suited for a particular mission requirement, one that takes into account efficiency, weight, thermal capacity needs, complexity, reliability, and other factors influencing the optimal choice for an engine and rotatable heat exchanger configuration.

In addition to yielding an improved gas turbine engine and rotatable heat exchanger, as explained in detail above, utilizing this relationship, the inventor found that the number of suitable or feasible gas turbine engine and rotatable heat exchanger designs capable of meeting the above design requirements could be greatly diminished, thereby facilitating a more rapid down selection of designs to consider as a gas turbine engine and rotatable heat exchanger is being developed. Such a benefit provides more insight to the requirements for a given gas turbine engine and rotatable heat exchanger well before specific technologies, integration and system requirements are developed fully. Such a benefit avoids late-stage redesign.

The desired relationship providing for the improved gas turbine engine, discovered by the inventor, is a Rotating Heat Exchanger Capacity Parameter (RHECP), expressed as:

$$\sqrt[4]{\frac{f_{centrifugal}}{g} \times \frac{f_{channel}}{\Delta H_{channel}} \times \frac{R_F}{BPR}},$$

where $f_{centrifugal}$ is equal to $N_S$ squared times $R_{HX}$; where $N_S$ is a rotational speed of a shaft to which the rotatable heat exchanger is coupled (in revolutions per minute); where $R_{HX}$ is a heat exchanger radius of a core of the rotatable heat exchanger; where g is a 9.81 meters per second squared; $f_{channel}$ is a ratio of $L_P$ to $D_P$; where $L_P$ is a passage length of a passage of the heat exchanger; where $D_P$ is a passage hydraulic diameter of the passage of the heat exchanger; where $\Delta H_{channel}$ is a head loss across the first passage when the gas turbine engine is operated at the 100% shaft speed operating condition; where $R_F$ is fan radius; and where BPR is a bypass ratio.

Notably, the inventor of the present disclosure found as a surrogate for the heat exchanger radius ($R_{HX}$), the following relationship may be used: a ratio of $R_{HX}$ to $R_S$ times a ratio of $R_S$ to $R_H$ times a ratio of $R_H$ to $R_F$ times $R_F$ ($R_{HX} = R_{HX}/R_S \times R_S/R_H \times R_H/R_F \times R_F$). Such a relationship may improve the application of the RHECP to the variety of engine parameters to improve a utility of the RHECP.

Engine parameters and modes of operation dictate rotational speeds, airflows through the engine, and the like at different points of the gas turbine engine. For the above RHECP, the following values are assumed:

TABLE 1

| Symbol | Description | Ranges appropriate for using Relationships (1), (2), (3) |
|---|---|---|
| RHECP | Rotating Heat Exchanger Capacity Parameter | 1.8 to 36.1, such as 1.8 to 23.7 (dimensionless) |
| $f_{centrifugal}$ | Centrifugal force function | 96.5 meters per second squared (m/s$^2$) to 79,943,796 m/s$^2$, such as 96.5 m/s$^2$ to 14,804,407 m/s$^2$ |
| $f_{channel}$ | Channel size function, equal to passage length ($L_P$) divided by passage hydraulic diameter ($D_P$) | 3 to 5,000, such as 3 to 3,000 (dimensionless) |
| $N_S$ | Shaft rotational speed when the engine is operated at a 100% shaft speed operating condition | 2,000 revolutions per minute (rpm) to 30,000 rpm |
| $R_{HX}/R_S$ | Ratio of a heat exchanger radius ($R_{HX}$) of a core of the rotatable heat exchanger to a radius of a shaft ($R_S$) rotatable with the rotatable heat exchanger | 1.1 to 5, such as 1.1 to 3 (dimensionless) |
| $R_S/R_H$ | Ratio of the radius of the shaft ($R_S$) to a hub radius ($R_H$) of the engine | 0.1 to 0.9, such as 0.1 to 0.5 (dimensionless) |
| $R_H/R_F$ | Ratio of the hub radius ($R_H$) of the engine to a fan radius ($R_F$) of the engine | 0.1 to 0.9, such as 0.1 to 0.5 (dimensionless) |
| $R_F$ | Fan radius of the engine | 0.2 meters (m) to 2 m |
| BPR | Bypass ratio of the engine | 3 to 30 (dimensionless) |
| $\Delta H_{channel}$ | Head loss across the first passage when the gas turbine engine is operated at the 100% shaft speed operating condition | 0.1 m to 200 m, such as 0.1 m to 120 m |

Figure 14:
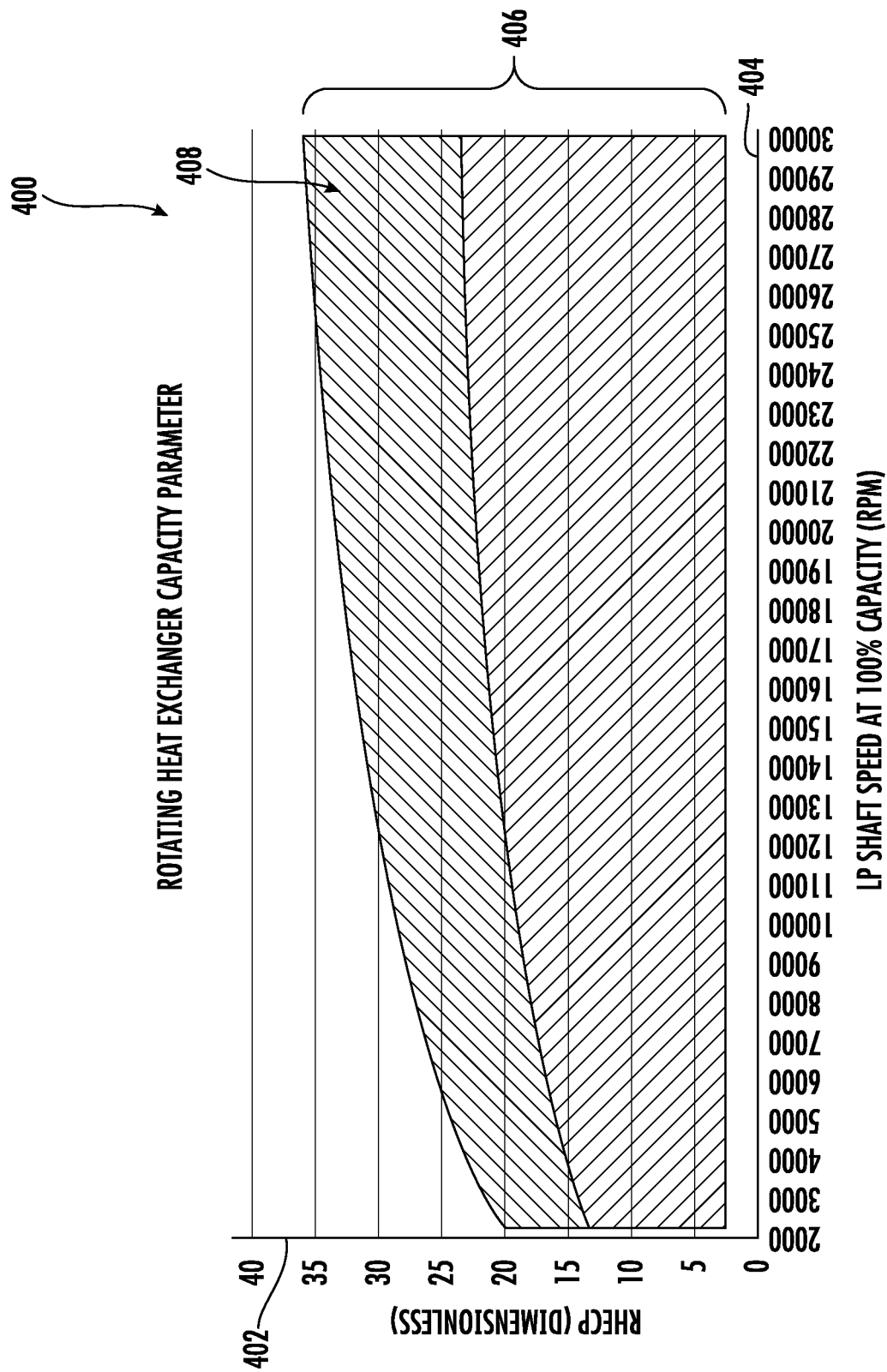
FIG. 14 a plot of RHECP on a Y-axis and shaft speed on an X-axis.

Referring now to FIGS. 13 and 14, various rotatable heat exchangers in accordance with the present disclosure are provided, such as are encompassed by the values provided above in TABLE 1. FIG. 13 provides a table including numerical values corresponding to several rotatable heat exchangers falling within the ranges depicted in FIG. 14. FIG. 14 provides a plot 400 of RHECP on a Y-axis 402 and shaft speed on an X-axis 404.

As shown in FIG. 14, the plot depicts a first range 406, with RHECP values greater than or equal to 1.8 and less than or equal to 36.1 and a shaft speed greater than or equal to 2,000 revolutions per minute (rpm) and less than or equal to 30,000 rpm. FIG. 14 additionally depicts a second range 408, with the RHECP values greater than or equal to 1.8 and less than or equal to 23.7, and the shaft speed greater than or equal to 2,000 rpm and less than or equal to 30,000 rpm.

It will be appreciated that although the discussion above is generally related to a rotatable heat exchanger providing cooling to a bleed airflow from a high pressure compressor and provided to a buffer cavity, in various embodiments of the present disclosure, the relationship outlined above as the RHECP may be applied to any other suitable rotatable heat exchanger configurations.

Further aspects are provided by the subject matter of the following clauses:

A rotatable heat exchanger, comprising: a first manifold assembly; a second manifold assembly; a core extending axially from the first manifold assembly to the second manifold assembly, wherein the first manifold assembly, the core, and the second manifold assembly are circumferentially disposed around and rotate with a shaft, the core comprising: a plurality of helical passages extending from the first manifold assembly to the second manifold assembly, wherein the plurality of helical passages includes a plurality of first-fluid passages fluidly coupled to the first manifold assembly and to the second manifold assembly, and a plurality of second-fluid passages fluidly coupled to the first manifold assembly and the second manifold assembly.

The rotatable heat exchanger of the preceding clause, wherein the first manifold assembly comprises a first-fluid inlet manifold and a second-fluid outlet manifold, and wherein the second manifold assembly comprises a first-fluid outlet manifold and a second-fluid inlet manifold; and wherein the plurality of first-fluid passages is fluidly coupled to the first-fluid inlet manifold and the first-fluid outlet manifold, and wherein the plurality of second-fluid passages is fluidly coupled to the second-fluid outlet manifold and the second-fluid inlet manifold.

The rotatable heat exchanger of any preceding clause, wherein the first manifold assembly comprises a plate positioned to fluidly isolate the first-fluid inlet manifold from the second-fluid outlet manifold; and wherein the first manifold assembly further comprises a plurality of tubes arranged in tube sets, wherein each tube set extends through the second-fluid outlet manifold and fluidly couples the first-fluid inlet manifold to a respective first-fluid passage of the plurality of first-fluid passages.

The rotatable heat exchanger of any preceding clause, wherein the second manifold assembly comprises a plate positioned to fluidly isolate the second-fluid inlet manifold from the first-fluid outlet manifold; and wherein the second manifold assembly further comprises a plurality of tubes arranged in tube sets, wherein each tube set extends through the second-fluid inlet manifold and fluidly couples the first-fluid outlet manifold to a respective first-fluid passage of the plurality of first-fluid passages.

The rotatable heat exchanger of any preceding clause, wherein the second manifold assembly includes a second-fluid inlet in fluid communication with the second-fluid inlet manifold, wherein the second-fluid inlet comprises a plurality of apertures defined along an inner wall of the second manifold assembly.

The rotatable heat exchanger of any preceding clause, wherein the first manifold assembly comprises a first-fluid inlet manifold and a second-fluid inlet manifold, and wherein the second manifold assembly comprises a first-fluid outlet manifold and a second-fluid outlet manifold; wherein the plurality of first-fluid passages is fluidly coupled to the first-fluid inlet manifold and the first-fluid outlet manifold, and wherein the plurality of second-fluid passages is fluidly coupled to the second-fluid inlet manifold and the second-fluid outlet manifold.

The rotatable heat exchanger of any preceding clause, wherein each first-fluid passage of the plurality of first-fluid passages is circumferentially and radially spaced from another first-fluid passage by a respective second-fluid passage of the plurality of second-fluid passages.

The rotatable heat exchanger of any preceding clause, wherein the core comprises an annular inner casing and an outer casing, wherein the plurality of first-fluid passages and the plurality of second-fluid passages are arranged circumferentially about the annular inner casing and radially stacked between the annular inner casing and the outer casing.

A gas turbine engine having a shaft coupled to a compressor section, the gas turbine engine comprising: a bearing compartment including a bearing cavity, a buffer cavity, and a seal disposed between the buffer cavity and the bearing cavity; a first-fluid source providing a first fluid; a second-fluid source providing a second fluid; and a rotatable heat exchanger extending circumferentially around and coupled to the shaft, the rotatable heat exchanger having a core including an annular inner casing and a plurality of helical passages extending helically about the annular inner casing, the plurality of helical passages comprising: a plurality of first-fluid passages fluidly coupled to the first-fluid source, wherein the first fluid flows in a first helical flow direction through the plurality of first-fluid passages; and a plurality of second-fluid passages fluidly coupled to, in serial flow order, the second-fluid source and to the buffer cavity of the bearing compartment, wherein the second fluid flows in a second helical flow direction.

The gas turbine engine of the preceding clause, wherein the first helical flow direction is either counter to the second helical flow direction or same as the second helical flow direction.

The gas turbine engine of any preceding clause, wherein the first-fluid source comprises an oil reservoir or the compressor section of the gas turbine engine; and wherein the second-fluid source comprises the compressor section of the gas turbine engine.

The gas turbine engine of any preceding clause, wherein the rotatable heat exchanger further comprises: a first manifold assembly disposed at a first end of the core, the first manifold assembly defining a first-fluid inlet manifold and a second-fluid outlet manifold; and a second manifold assembly disposed at a second end of the core, the second manifold assembly defining a first-fluid outlet manifold and second-fluid inlet manifold.

The gas turbine engine of any preceding clause, wherein the rotatable heat exchanger further comprises: a first manifold assembly disposed at a first end of the core, the first manifold assembly defining a first-fluid inlet manifold and a second-fluid inlet manifold; and a second manifold assembly disposed at a second end of the core, the second manifold assembly defining a first-fluid outlet manifold and second-fluid outlet manifold.

The gas turbine engine of any preceding clause, wherein the plurality of first-fluid passages fluidly couples the first-fluid inlet manifold to the first-fluid outlet manifold; and wherein the plurality of second-fluid passages fluidly couples the second-fluid inlet manifold to the second-fluid outlet manifold.

The gas turbine engine of any preceding clause, wherein the first manifold assembly comprises a plate positioned to fluidly isolate the first-fluid inlet manifold from the second-fluid outlet manifold, wherein the first manifold assembly further comprises a plurality of tubes arranged in tube sets, wherein each tube set of the plurality of tubes extends through the second-fluid outlet manifold, and wherein each tube set fluidly couples the first-fluid inlet manifold to a respective first-fluid passage of the plurality of first-fluid passages.

The gas turbine engine of any preceding clause, wherein the second manifold assembly comprises a plate positioned to fluidly isolate the second-fluid inlet manifold from the first-fluid outlet manifold, wherein the second manifold assembly further comprises a plurality of tubes arranged in tube sets, wherein each tube set extends through the second-fluid inlet manifold and fluidly couples the first-fluid outlet manifold to a respective first-fluid passage of the plurality of first-fluid passages.

The gas turbine engine of any preceding clause, wherein the bearing cavity of the bearing compartment is fluidly coupled between the first-fluid outlet manifold and the first-fluid inlet manifold.

The gas turbine engine of any preceding clause, further comprising a heat exchanger in thermal communication with the first fluid between the first-fluid outlet manifold and the first-fluid inlet manifold.

The gas turbine engine of any preceding clause, wherein the buffer cavity of the bearing compartment is fluidly coupled to the second-fluid outlet manifold and wherein the second-fluid inlet manifold is fluidly coupled to the compressor section.

The gas turbine engine of any preceding clause, wherein the core comprises an outer casing, wherein the plurality of first-fluid passages and the plurality of second-fluid passages are arranged circumferentially about the annular inner casing and radially stacked between the annular inner casing and the outer casing.

A bearing cooling system, comprises a rotatable heat exchanger, a bearing compartment including a buffer cavity and a seal, a first-fluid source providing a first fluid. The first fluid source is in fluid communication with the rotatable heat exchanger and the buffer cavity.

A gas turbine engine comprising: a fan section having a fan defining a fan radius ($R_F$); a turbomachine comprising a turbine, the gas turbine engine defining a bypass ratio (BPR) of airflow from the fan over the turbomachine to airflow from the fan into an inlet of the turbomachine when the gas turbine engine is operated at a 100% shaft speed operating condition; a shaft coupled to the turbine, the shaft defining a rotational speed ($N_S$) when the gas turbine engine is operated at the 100% shaft speed operating condition; a rotatable heat exchanger extending circumferentially around and coupled to the shaft, the rotatable heat exchanger having a core defining a heat exchanger radius ($R_{HX}$) and including an annular inner casing, the rotatable heat exchanger further including a plurality of passages extending about the annular inner casing, the plurality of passages comprising a first passage defining a passage length ($L_P$) and a passage hydraulic diameter ($D_P$), the rotatable heat exchanger defining a Rotating Heat Exchanger Capacity Parameter (RHECP) greater than or equal to 1.8 and less than or equal to 36.1, RHECP determined according to the following relationship:

$$\sqrt[4]{\frac{f_{centrifugal}}{g} \times \frac{f_{channel}}{\Delta H_{channel}} \times \frac{R_F}{BPR}},$$

where g is a 9.81 meters per second squared; $\Delta H_{channel}$ is a head loss across the first passage when the gas turbine engine is operated at the 100% shaft speed operating condition, with the heat transfer fluid flowing therethrough; $f_{channel}$ is a ratio of $L_P$ to $D_P$; and $f_{centrifugal}$ is equal to $N_S$ squared times $R_{HX}$.

The gas turbine engine of any preceding clause, wherein RHECP is less than or equal to 23.7.

The gas turbine engine of any preceding clause, wherein $f_{channel}$ is greater than or equal 3 and less than or equal to 5,000.

The gas turbine engine of any preceding clause, wherein $f_{channel}$ is greater than or equal 3 and less than or equal to 3,000.

The gas turbine engine of any preceding clause, wherein $N_S$ is greater than or equal to 2,000 revolutions per minute (rpm) and less than or equal to 30,000 rpm.

The gas turbine engine of any preceding clause, wherein $\Delta H_{channel}$ is greater than or equal to 0.1 meters and less than or equal to 200 meters.

The gas turbine engine of any preceding clause, wherein the BPR is greater than or equal to 3 and less than or equal to 30.

The gas turbine engine of any preceding clause, wherein the fan section comprises a hub defining a hub radius ($R_H$), wherein the shaft defines a shaft radius ($R_S$), wherein $R_{HX}$ equals a ratio of $R_{HX}$ to $R_S$ times a ratio of $R_S$ to $R_H$ times a ratio of $R_H$ to $R_F$ times $R_F$.

The gas turbine engine of any preceding clause, wherein the ratio of $R_{HX}$ to $R_S$ is greater than or equal to 1.1 and less than or equal to 5, wherein the ratio of $R_S$ to $R_H$ is greater than or equal to 0.1 and less than or equal to 0.9, wherein the ratio of $R_H$ to $R_F$ is greater than or equal to 0.1 and less than or equal to 0.9, and wherein $R_F$ is greater than or equal to 0.2 meters and less than or equal to 2 meters.

The gas turbine engine of any preceding clause, wherein the plurality of passages is a plurality of helical passages.

The gas turbine engine of any preceding clause, wherein the plurality of helical passages comprises a plurality of first-fluid passages fluidly coupled to a first-fluid source, wherein the first fluid flows in a first helical flow direction through the plurality of first-fluid passages; and a plurality of second-fluid passages fluidly coupled to, in serial flow order, a second-fluid source and to a buffer cavity, wherein the second fluid flows in a second helical flow direction.

The gas turbine engine of any preceding clause, wherein the shaft is a low pressure shaft and wherein the turbine is a low pressure turbine.

A method of operating a gas turbine engine, the gas turbine engine having a fan section and a turbomachine and defining a bypass ratio (BPR) over the turbomachine, the method comprising: operating the gas turbine engine at a 100% shaft speed operating condition, wherein operating the gas turbine engine comprises rotating a shaft coupled to a turbine at a rotational speed ($N_S$) and rotating a rotatable heat exchanger extending circumferentially around and coupled to the shaft to remove heat from a heat transfer fluid, wherein the rotatable heat exchanger includes a core defining a heat exchanger radius ($R_{HX}$) and further includes an inner casing, the rotatable heat exchanger further including a plurality of passages extending about the inner casing, the plurality of passages comprising a first passage defining a passage length ($L_P$) and a passage hydraulic diameter ($D_P$), the rotatable heat exchanger defining a Rotating Heat Exchanger Capacity Parameter (RHECP) greater than or equal to 1.8 and less than or equal to 36.1, RHECP determined according to the following relationship:

$$\sqrt[4]{\frac{f_{centrifugal}}{g} \times \frac{f_{channel}}{\Delta H_{channel}} \times \frac{R_F}{BPR}},$$

where g is a 9.81 meters per second squared; $\Delta H_{channel}$ is a head loss across the first passage when the gas turbine engine is operated at the 100% shaft speed operating condition, with the heat transfer fluid flowing therethrough; $f_{channel}$ is a ratio of $L_P$ to $D_P$; $f_{centrifugal}$ is equal to $N_S$ squared times $R_{HX}$.

The method of any preceding clause, wherein RHECP is less than or equal to 23.7.

The method of any preceding clause, wherein $f_{channel}$ is greater than or equal 3 and less than or equal to 5,000.

The method of any preceding clause, wherein $f_{channel}$ is greater than or equal 3 and less than or equal to 3,000.

The method of any preceding clause, wherein $N_S$ is greater than or equal to 2,000 revolutions per minute (rpm) and less than or equal to 30,000 rpm.

The method of any preceding clause, wherein $\Delta H_{channel}$ is greater than or equal to 0.1 meters and less than or equal to 200 meters.

The method of any preceding clause, wherein the BPR is greater than or equal to 3 and less than or equal to 30.

A rotatable heat exchanger assembly for a gas turbine engine, the gas turbine engine comprising a fan section, a turbomachine, and a shaft, the fan section having a fan defining a fan radius ($R_F$), the gas turbine engine defining a bypass ratio (BPR) of airflow from the fan over the turbomachine to airflow from the fan into an inlet of the turbomachine when the gas turbine engine is operated at a 100% shaft speed operating condition, and the shaft coupled to a turbine of the turbomachine and defining a rotational speed ($N_S$) when the gas turbine engine is operated at the 100% shaft speed operating condition, wherein the rotatable heat exchanger assembly comprises: a rotatable heat exchanger extending circumferentially around and coupled to the shaft when the rotatable heat exchanger is installed in the gas turbine engine, the rotatable heat exchanger having a core defining a heat exchanger radius ($R_{HX}$) and including an annular inner casing, the rotatable heat exchanger further including a plurality of passages extending about the annular inner casing, the plurality of passages comprising a first passage defining a passage length ($L_P$) and a passage hydraulic diameter ($D_P$), the rotatable heat exchanger defining a Rotating Heat Exchanger Capacity Parameter (RHECP) greater than or equal to 1.8 and less than or equal to 36.1, RHECP determined according to the following relationship:

$$\sqrt[4]{\frac{f_{centrifugal}}{g} \times \frac{f_{channel}}{\Delta H_{channel}} \times \frac{R_F}{BPR}},$$

where g is a 9.81 meters per second squared; $\Delta H_{channel}$ is a head loss across the first passage when the gas turbine engine is operated at the 100% shaft speed operating condition, with the heat transfer fluid flowing therethrough; $f_{channel}$ is a ratio of $L_P$ to $D_P$; and $f_{centrifugal}$ is equal to $N_S$ squared times $R_{HX}$.

This written description uses examples to disclose the present disclosure, including the best mode and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A gas turbine engine having a shaft coupled to a compressor section and defining a longitudinal axis, a radial direction perpendicular to the longitudinal axis, a circumferential direction around the longitudinal axis, and an axial direction extending parallel to the longitudinal axis, the shaft extends circumferentially about the longitudinal axis, the gas turbine engine comprising:
   a bearing compartment including a bearing cavity, a buffer cavity, and a seal disposed between the buffer cavity and the bearing cavity;
   a first-fluid source providing a first fluid;
   a second-fluid source providing a second fluid; and
   a rotatable heat exchanger extending circumferentially around and coupled to the shaft, the rotatable heat exchanger having a core including an annular inner casing and a plurality of helical passages extending helically about the annular inner casing, the plurality of helical passages comprising:
      a plurality of first-fluid passages fluidly coupled to the first-fluid source, wherein the first fluid flows in a first helical flow direction through the plurality of first-fluid passages; and
      a plurality of second-fluid passages fluidly coupled to, in serial flow order, the second-fluid source and to the buffer cavity of the bearing compartment, wherein the second fluid flows in a second helical flow direction;
   wherein the rotatable heat exchanger further comprises:
   a first manifold assembly disposed at a first end of the core, the first manifold assembly defining a first-fluid inlet manifold having a first-fluid inlet and a second-fluid outlet manifold having a second-fluid outlet, wherein the first-fluid inlet and the second-fluid outlet are each annular and extend around the longitudinal axis and each face in a same axial direction; and
   a second manifold assembly disposed at a second end of the core opposite the first end of the core, the second manifold assembly defining a first-fluid outlet manifold having a first-fluid outlet and a second-fluid inlet manifold having a second-fluid inlet.

2. The gas turbine engine of claim 1, wherein the first helical flow direction is counter to the second helical flow direction.

3. The gas turbine engine of claim 1, wherein the first-fluid source comprises an oil reservoir of the gas turbine engine;
   and wherein the second-fluid source comprises the compressor section of the gas turbine engine.

4. The gas turbine engine of claim 1, wherein the first-fluid inlet is radially inward of the second-fluid outlet.

5. The gas turbine engine of claim 4, wherein the plurality of first-fluid passages fluidly couples the first-fluid inlet manifold to the first-fluid outlet manifold; and
   wherein the plurality of second-fluid passages fluidly couples the second-fluid inlet manifold to the second-fluid outlet manifold.

6. The gas turbine engine of claim 4, wherein the first manifold assembly comprises a plate positioned to fluidly isolate the first-fluid inlet manifold from the second-fluid outlet manifold, wherein the first manifold assembly further comprises a plurality of tubes arranged in tube sets, wherein each tube set of the plurality of tubes extends through the second-fluid outlet manifold, and wherein each tube set fluidly couples the first-fluid inlet manifold to a respective first-fluid passage of the plurality of first-fluid passages.

7. The gas turbine engine of claim 4, wherein the second manifold assembly comprises a plate positioned to fluidly isolate the second-fluid inlet manifold from the first-fluid outlet manifold, wherein the second manifold assembly further comprises a plurality of tubes arranged in tube sets, wherein each tube set extends through the second-fluid inlet manifold and fluidly couples the first-fluid outlet manifold to a respective first-fluid passage of the plurality of first-fluid passages.

8. The gas turbine engine of claim 4, wherein the bearing cavity of the bearing compartment is fluidly coupled between the first-fluid outlet manifold and the first-fluid inlet manifold.

9. The gas turbine engine of claim 4, further comprising an additional heat exchanger in thermal communication with the first fluid between the first-fluid outlet manifold and the first-fluid inlet manifold.

10. The gas turbine engine of claim 9, wherein the first fluid travels in a first-fluid flowpath from the first-fluid source to the first-fluid inlet via a pump, through the plurality of first-fluid passages of the rotatable heat exchanger in the first helical flow direction, out the first-fluid outlet, to a bearing cavity inlet of the bearing compartment, through the bearing cavity to provide cooling to a bearing assembly contained in the bearing cavity, out a bearing cavity outlet, to the additional heat exchanger that cools the first fluid before traveling back to the first-fluid source.

11. The gas turbine engine of claim 10, wherein the second fluid travels in a second-fluid flowpath from a second-fluid source outlet of the second-fluid source to the second-fluid inlet, through the plurality of second-fluid passages of the rotatable heat exchanger in the second helical flow direction, out the second-fluid outlet, to a buffer cavity inlet of the bearing compartment, through the buffer cavity to provide an air gap and to pressurize the seal between the buffer cavity and the bearing cavity, out a buffer cavity outlet, and back to the second-fluid source via a second-fluid source inlet.

12. The gas turbine engine of claim 11, wherein the second-fluid source outlet is in fluid communication with the compressor section of the gas turbine engine, and wherein the second fluid is a high pressure compressed air from the compressor section.

13. The gas turbine engine of claim 12, wherein the second-fluid source inlet is in fluid communication with the compressor section and a turbine section of the gas turbine engine.

14. The gas turbine engine of claim 4, wherein the buffer cavity of the bearing compartment is fluidly coupled to the second-fluid outlet manifold and wherein the second-fluid inlet manifold is fluidly coupled to the compressor section.

15. The gas turbine engine of claim 4, wherein the core comprises an outer casing, wherein the plurality of first-fluid passages and the plurality of second-fluid passages are arranged circumferentially about the annular inner casing and radially stacked between the annular inner casing and the outer casing.

\* \* \* \* \*